United States Patent
Yew et al.

(10) Patent No.: US 11,901,554 B2
(45) Date of Patent: Feb. 13, 2024

(54) ANODE MATERIAL FOR SECONDARY BATTERY, ANODE FOR SECONDARY BATTERY AND SECONDARY BATTERY

(71) Applicant: National Tsing Hua University, Hsinchu (TW)

(72) Inventors: Tri-Rung Yew, Hsinchu (TW); Kai-Wei Lan, Hsinchu (TW); Chun-Te Ho, Hsinchu (TW); Chia-Tung Kuo, Hsinchu (TW); Tien-Chi Ji, Hsinchu (TW); Yi-Ting Lee, Hsinchu (TW); Yun-Chen Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 50 days.

(21) Appl. No.: 17/840,634

(22) Filed: Jun. 15, 2022

(65) Prior Publication Data
US 2022/0311000 A1    Sep. 29, 2022

Related U.S. Application Data

(62) Division of application No. 16/862,588, filed on Apr. 30, 2020.

(30) Foreign Application Priority Data

Jan. 16, 2020    (TW) ................. 109101494

(51) Int. Cl.
*H01M 4/131*    (2010.01)
*H01M 4/02*    (2006.01)
(Continued)

(52) U.S. Cl.
CPC ........... *H01M 4/525* (2013.01); *H01M 4/131* (2013.01); *H01M 4/505* (2013.01);
(Continued)

(58) Field of Classification Search
CPC ...... H01M 4/525; H01M 4/131; H01M 50/45; H01M 4/505; H01M 2004/021; H01M 2004/027
See application file for complete search history.

(56) References Cited

U.S. PATENT DOCUMENTS

2002/0012842 A1    1/2002    Tsujimoto et al.
2004/0265691 A1*  12/2004   Imoto ................. C22C 13/00
                                                          429/221
(Continued)

FOREIGN PATENT DOCUMENTS

CN    1246203    3/2000
CN    1320980    11/2001
(Continued)

OTHER PUBLICATIONS

"Notice of allowance of China Counterpart Application", dated Jun. 30, 2023, p. 1-p. 4.

Primary Examiner — Kourtney R S Carlson
(74) Attorney, Agent, or Firm — JCIPRNET

(57) ABSTRACT

An anode material for a secondary battery is provided. The anode material for the secondary battery includes a metal oxide containing four or more than four elements, or an oxide mixture containing four or more than four elements. The metal oxide includes cobalt-copper-tin oxide, silicon-tin-iron oxide, copper-manganese-silicon oxide, tin-manganese-nickel oxide, manganese-copper-nickel oxide, or nickel-copper-tin oxide. The oxide mixture includes the oxide mixture containing cobalt, copper and tin, the oxide mixture containing silicon, tin and iron, the oxide mixture containing copper, manganese and silicon, the oxide mixture containing tin, manganese and nickel, the oxide mixture containing manganese, copper and nickel, or the oxide mixture containing nickel, copper and tin.

5 Claims, 8 Drawing Sheets

(51) Int. Cl.
  *H01M 4/525* (2010.01)
  *H01M 4/505* (2010.01)
  *H01M 10/0525* (2010.01)
  *H01M 50/46* (2021.01)

(52) U.S. Cl.
  CPC ....... *H01M 10/0525* (2013.01); *H01M 50/46* (2021.01); *H01M 2004/021* (2013.01); *H01M 2004/027* (2013.01)

(56) References Cited

U.S. PATENT DOCUMENTS

| | | | |
|---|---|---|---|
| 2007/0059592 A1 | 3/2007 | Takami et al. | |
| 2008/0193846 A1 | 8/2008 | Morishima | |
| 2009/0123851 A1 | 5/2009 | Soma et al. | |
| 2012/0301390 A1* | 11/2012 | Kawakami | C01G 53/42 423/594.2 |
| 2013/0164623 A1* | 6/2013 | Saka | H01M 4/505 429/231.1 |
| 2013/0177808 A1* | 7/2013 | Wang | H01M 10/4235 429/231.95 |
| 2014/0162123 A1 | 6/2014 | Fukuoka et al. | |
| 2017/0288214 A1* | 10/2017 | Seki | H01M 4/505 |

FOREIGN PATENT DOCUMENTS

| | | |
|---|---|---|
| CN | 1744352 | 3/2006 |
| CN | 1992396 | 7/2007 |
| CN | 101388460 | 3/2009 |
| CN | 102569877 | 7/2012 |
| CN | 103460457 | 12/2013 |
| CN | 108539151 | 9/2018 |
| JP | 2002003220 | 1/2002 |
| JP | 2002203559 | 7/2002 |
| JP | 2012142154 | 7/2012 |
| JP | 2017103139 | 6/2017 |
| KR | 20090076275 | 7/2009 |
| KR | 20130122279 | 11/2013 |
| WO | 02054512 | 7/2002 |

\* cited by examiner

ANODE MATERIAL FOR SECONDARY BATTERY, ANODE FOR SECONDARY BATTERY AND SECONDARY BATTERY

CROSS-REFERENCE TO RELATED APPLICATION

This application is a divisional application of and claims the priority benefit of a prior application Ser. No. 16/862,588, filed on Apr. 30, 2020. The prior application Ser. No. 16/862,588 claims the priority benefit of Taiwan application serial no. 109101494, filed on Jan. 16, 2020. The entirety of each of the above-mentioned patent applications is hereby incorporated by reference herein and made a part of this specification.

BACKGROUND

Technical Field

The present invention relates to an electrode material, an electrode, and a battery, and in particular, to an anode material for a secondary battery, an anode for a secondary battery, and a secondary battery.

Description of Related Art

In recent years, the market demand for secondary lithium batteries that can be repeatedly charged and discharged and with the features of lightweight, high voltage value and high energy density has rapidly increased. Therefore, current requirements for secondary lithium batteries such as lightweight, durability, high voltage, high energy density and high safety are becoming more and more demanding. The secondary lithium batteries have very high potential in the application and expandability of light electric vehicles, electric vehicles, and the large power storage industry. Generally, the most common commercial electrode material is graphite, but the capacity of graphite (theoretical value is 372 mAh/g) is low, so the performance of the battery made by it is limited. Therefore, finding an electrode material for secondary batteries with high stability and high capacity is one of the goals that those skilled in the art want to achieve.

SUMMARY

In view of this, the present invention provides an anode material and an anode which are used in a secondary battery and make the secondary battery have good capacitance and stability.

An anode material for a secondary battery provided by one embodiment of the present invention includes cobalt-copper-tin oxide represented by one of the following Formulae (1) to (3):

$$Co_5Cu_1Sn_3MO_{x1} \qquad \text{Formula (1),}$$

$$Co_2Cu_1Sn_1MO_{x2} \qquad \text{Formula (2),}$$

$$Co_1Cu_1Sn_1MO_{x3} \qquad \text{Formula (3),}$$

wherein x1 is 8, 9 or 14, x2 is 4, 6 or 8, x3 is 3, 4 or 5, and M is at least one element selected from the group consisting of Ni, Cr, Mn, Zn, Al, Ti, In, Mo and W, and the atomic proportion of M is 10 atomic % or less relative to a total number of atoms of the metal elements in the cobalt-copper-tin oxide represented by Formula (1), Formula (2), or Formula (3).

An anode material for a secondary battery according to another embodiment of the present invention includes an oxide mixture obtained by performing a mixing step of at least one of $Co_3O_4$, $Co_2O_3$ and CoO, at least one of CuO and $Cu_2O$, and at least one of SnO and $SnO_2$, wherein the atomic ratio of cobalt to copper to tin in the oxide mixture is 5:1:3, 2:1:1, or 1:1:1.

An anode material for a secondary battery provided by another embodiment of the present invention includes silicon-tin-iron oxide represented by one of the following Formulae (4) to (6):

$$Si_4Sn_1Fe_{16}MO_{x4} \qquad \text{Formula (4),}$$

$$Si_1Sn_1Fe_1MO_{x5} \qquad \text{Formula (5),}$$

$$Si_4Sn_1Fe_1MO_{x6} \qquad \text{Formula (6),}$$

wherein x4 is 21 to 34, x5 is 3 to 5, x6 is 6 to 11.5, M is at least one element selected from the group consisting of Cr, Mn, Zn, Al, Ti, In, Mo and W, and the atomic proportion of M is 10 atomic % or less relative to the total number of atoms of the elements other than oxygen element in the silicon-tin-iron oxide represented by Formula (4), Formula (5) or Formula (6).

An anode material for a secondary battery according to another embodiment of the present invention includes an oxide mixture obtained by performing a mixing step of at least one of $SiO_2$ and SiO, at least one of SnO and $SnO_2$, and at least one of $Fe_2O_3$, $Fe_3O_4$ and FeO, wherein the atomic ratio of silicon to tin to iron in the oxide mixture is 4:1:16, 1:1:1 or 4:1:1.

An anode material for a secondary battery provided by another embodiment of the present invention includes copper-manganese-silicon oxide represented by the following Formula (7):

$$Cu_{x7}Mn_{7-x7}SiMO_{12} \qquad \text{Formula (7),}$$

wherein x7 is greater than 0 and less than or equal to 1, and M is at least one element selected from the group consisting of Cr, Sn, Ni, Co, Zn, Al, Ti, In, Mo and W, and the atomic proportion of M is 10 atomic % or less relative to the total number of atoms of the elements other than oxygen element in the copper-manganese-silicon oxide represented by Formula (7).

An anode material for a secondary battery according to another embodiment of the present invention includes an oxide mixture obtained by performing a mixing step of at least one of CuO and $Cu_2O$, at least one of $SiO_2$ and SiO, and at least one of MnO, $MnO_2$, $Mn_2O_3$ and $Mn_3O_4$, wherein the atomic ratio of copper to manganese to silicon in the oxide mixture is 1:1:1, 1:4:1, 4:1:1, or 1:1:4.

An anode material for a secondary battery provided by another embodiment of the present invention includes tin-manganese-nickel oxide represented by one of the following Formulae (8) to (11):

$$Sn_1Mn_2Ni_1MO_{x8} \qquad \text{Formula (8),}$$

$$Sn_1Mn_1Ni_2MO_{x9} \qquad \text{Formula (9),}$$

$$Sn_2Mn_1Ni_1MO_{x10} \qquad \text{Formula (10),}$$

$$Sn_1Mn_1Ni_1MO_{x11} \qquad \text{Formula (11),}$$

wherein x8 is 4 to 7, x9 is 4 to 7, x10 is 4 to 7, x11 is 3 to 6, and M is at least one element selected from the group consisting of Cr, Mn, Zn, Al, Ti, In, Mo and W, and the atomic proportion of M is 10 atomic % or less relative to the total number of atoms of the metal elements in the tinmanganese-nickel oxide represented by Formula (8), Formula (9), Formula (10) or Formula (11).

An anode material for a secondary battery provided by another embodiment of the present invention includes an oxide mixture obtained by performing a mixing step of at least one of SnO and $SnO_2$, at least one of MnO, $MnO_2$, $Mn_2O_3$ and $Mn_3O_4$, and at least one of NiO and $Ni_2O_3$, wherein the atomic ratio of tin to manganese to nickel in the oxide mixture is 1:2:1, 1:1:1, 1:1:2, or 2:1:1.

An anode material for a secondary battery provided by another embodiment of the present invention includes manganese-copper-nickel oxide represented by one of the following Formulae (12) to (14):

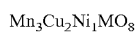   Formula (12),

   Formula (13),

   Formula (14), wherein M is at least one element selected from the group consisting of Fe, Cr, Zn, Al, Ti, In, Mo, W and Si, and the atomic proportion of M is 10 atomic % or less relative to the total number of atoms of the metal elements in the manganese-copper-nickel oxide represented by Formula (12), Formula (13), or Formula (14).

An anode material for a secondary battery provided by another embodiment of the present invention includes an oxide mixture obtained by performing a mixing step of at least one of MnO, $MnO_2$, $Mn_2O_3$ and $Mn_3O_4$, at least one of CuO and $Cu_2O$, and at least one of NiO and $Ni_2O_3$, wherein the atomic ratio of Manganese to copper to nickel in the oxide mixture is 3:2:1, 2:1:1 or 1:1:1.

An anode material for a secondary battery provided by another embodiment of the present invention includes nickel-copper-tin oxide represented by one of the following Formulae (15) to (17):

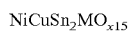   Formula (15),

   Formula (16),

   Formula (17), wherein x15 is 3, 6 or 9, x16 is 4, 6 or 9, x17 is 4, 6 or 9, and M is at least one element selected from the group consisting of Cr, Mn, Zn, Al, Ti, In, Mo, W and Co, and the atomic proportion of M is 10 atomic % or less relative to the total number of atoms of the metal elements in the nickel-copper-tin oxide represented by Formula (15), Formula (16) or Formula (17).

An anode material for a secondary battery according to another embodiment of the present invention includes an oxide mixture obtained by performing a mixing step of at least one of $Ni_2O_3$ and NiO, at least one of CuO and $Cu_2O$, and at least one of SnO and $SnO_2$, wherein the atomic ratio of nickel to copper to tin in the oxide mixture is 1:1:2, 2:1:3 or 1:2:3.

An anode for a secondary battery according to an embodiment of the present invention includes a current collector and an anode material layer. The anode material layer is disposed on the current collector and includes any of the anode materials for secondary batteries as described above.

A secondary battery provided by an embodiment of the present invention includes a cathode, an anode, an electrolyte, and a package structure. The anode is arranged separately from the cathode, and the anode is the anode for a secondary battery as described above. The electrolyte is placed between the cathode and the anode. The package structure packages the cathode, the anode and the electrolyte.

Based on the above, the anode material for a secondary battery of the present invention includes the metal oxide represented by one of Formulae (1) to (17), or includes the oxide mixture containing cobalt, copper and tin, the oxide mixture containing silicon, tin and iron, the oxide mixture containing copper, manganese and silicon, the oxide mixture containing tin, manganese and nickel, the oxide mixture containing manganese, copper and nickel, or the oxide mixture containing nickel, copper and tin, which has the specific atomic proportion of the elements, such that the anode material for a secondary battery of the present invention can be used in secondary batteries and make the secondary batteries have good capacitance, stability and charge-discharge cycle life.

In order to make the above-mentioned features and advantages of the present invention more comprehensible, embodiments are described below in detail with the accompanying drawings as follows.

DESCRIPTION OF THE EMBODIMENTS

Figure 1:
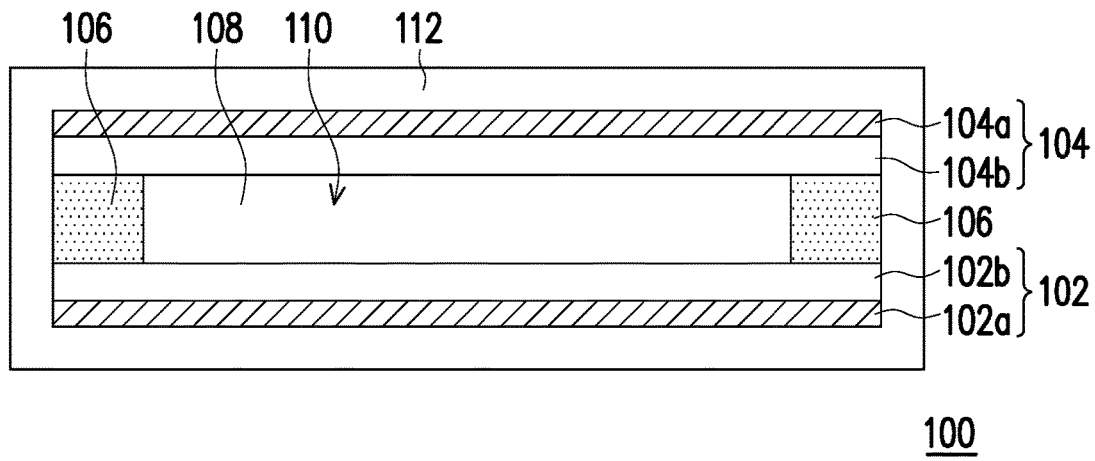
FIG. 1 is a schematic cross-sectional view of a secondary battery according to an embodiment of the present invention.

In the specification, scopes represented by "a numerical value to another numerical value" are schematic representations in order to avoid listing all of the numerical values in the scopes in the specification. Therefore, the recitation of a specific numerical range covers any numerical value in the numerical range and a smaller numerical range defined by any numerical value in the numerical range, as is the case with any numerical value and a smaller numerical range thereof in the specification.

As used herein, "about," "approximately," "essentially" or "substantially" is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about," "approximately," "essentially" or "substantially" as used herein based on measurement properties or other properties, instead of applying one standard deviation across all the properties.

In order to prepare an anode material that can be applied to an anode of a secondary battery and make the secondary battery have good stability and good capacitance, the present invention provides an anode material that can achieve the above advantages. In the following, specific embodiments are described as examples according to which the present invention can surely be implemented.

An embodiment of the present invention provides an anode material, which may include a metal oxide containing four or more than four elements, or an oxide mixture containing four or more than four elements. In the present embodiment, the anode material may be a powder, a film, or a bulk material.

In the present embodiment, the method for preparing the metal oxide containing four or more elements includes, for example, a hydrothermal method, a co-precipitation method, a sol-gel method, a solid-state method, an evaporation method, a sputtering method, or a vapor deposition method, but the invention is not limited thereto. In an embodiment using a hydrothermal method to prepare the metal oxide containing four or more than four elements, the temperature may be about 200° C. or more, the temperature holding time may be about 5 hours or more, and the ambient pressure may be about $10^{-2}$ Torr or more. In an embodiment using a co-precipitation method to prepare the metal oxide containing four or more than four elements, co-precipitation is first performed, and the reaction temperature may be 200° C. or more, the pH of the solution may be from about 2 to about 12, the temperature holding time may be about 1 hour or more; after the reaction is completed, the calcination treatment is performed, and the calcination temperature may be about 300° C. or more, the temperature holding time may be about 1 hour or more. In an embodiment using a sol-gel method to prepare the metal oxide containing four or more than four elements, the temperature may be about 100° C. or more, the solution pH may be about 2 to about 12, and the temperature holding time may be about 5 hours or more. In addition, in an embodiment using a solid-state method to prepare the metal oxide containing four or more than four elements, the temperature may be about 100° C. or more, and the temperature holding time may be about 8 hours or more. In the embodiment using an evaporation method to prepare the metal oxide containing four or more than four elements, the temperature may be about 25° C. or more, the evaporation time may be about 1 hour or more, and the ambient pressure may be about $10^{-3}$ Torr or more. In an embodiment in which the metal oxide containing four or more elements is prepared by a sputtering method, the temperature may be about 25° C. or more, the sputtering time may be about 0.5 hours or more, and the ambient pressure may be about $10^{-3}$ Torr or more. In an embodiment using a vapor deposition method to prepare the metal oxide containing four or more than four elements, the temperature may be about 25° C. or more, the deposition time may be about 1 hour or more, and the ambient pressure may be about $10^{-3}$ Torr or more.

In the present embodiment, the metal oxide containing four or more than four elements may include cobalt-copper-tin oxide, silicon-tin-iron oxide, copper-manganese-silicon oxide, tin-manganese-nickel oxide, manganese-copper-nickel oxide, or nickel-copper-tin oxide. In the following, the above-mentioned various oxides will be described in detail.

Cobalt-Copper-Tin Oxide

In the present embodiment, the cobalt-copper-tin oxide may be represented by one of the following Formulae (1) to (3):

$$Co_5Cu_1Sn_3MO_{x1} \qquad \text{Formula (1),}$$

$$Co_2Cu_1Sn_1MO_{x2} \qquad \text{Formula (2),}$$

$$Co_1Cu_1Sn_1MO_{x3} \qquad \text{Formula (3).}$$

In Formula (1), x1 is 8, 9, or 14. In Formula (2), x2 is 4, 6, or 8. In Formula (3), x3 is 3, 4 or 5. If x1, x2, and x3 respectively meet the specific values listed above, a secondary battery to which the anode material including the cobalt-copper-tin oxide is applied has excellent capacitance, improved capacity retention, and excellent cycle life.

In each of Formulas (1), (2) and (3), M may be at least one element selected from the group consisting of Ni, Cr, Mn, Zn, Al, Ti, In, Mo, and W. The atomic proportion of M is 10 atomic % or less relative to the total number of atoms of the metal elements in the cobalt-copper-tin oxide represented by Formula (1), Formula (2), or Formula (3). In other words, the cobalt-copper-tin oxide represented by Formula (1), Formula (2) or Formula (3) may not contain the element M, but only include four elements, i.e., cobalt, copper, tin and oxygen. It is worth mentioning that, compared to cobalt-copper-tin oxides that do not contain the element M, cobalt-copper-tin oxides that contain M with an atomic proportion greater than 0 and less than or equal to 10 atomic % have an increase in electrical conductivity by about 10% or more. In addition, in the present embodiment, in the case of cobalt-copper-tin oxide containing the element M, M may replace a part of cobalt, copper, and/or tin. For example, in one embodiment, M may replace a part of cobalt; in another embodiment, M may replace a part of cobalt and a part of copper; in yet another embodiment, M may replace a part of cobalt, a part of copper and a part of tin, but the invention is not limited thereto. It should be noted that, in the present embodiment, the number of atoms in the cobalt-copper-tin oxide represented by Formula (1), Formula (2) or Formula (3) may have an error of ±10% caused by the formation of oxygen vacancies or the nonuniform diffusion.

In the present embodiment, the cobalt-copper-tin oxide represented by Formula (1), Formula (2), or Formula (3) may have a Spinel structure, a Perovskite structure, a Sodium chloride structure or a Chalcopyrite structure. It is worth mentioning that the cobalt-copper-tin oxide represented by Formula (1), Formula (2) or Formula (3) allows more oxygen vacancies by having the above-mentioned structures, thereby in the secondary battery to which the anode material including the said cobalt-copper-tin oxide is applied, lithium ions can be easily moved in and out quickly, thus effectively improving the lithium ion diffusion rate and the ionic conductivity. In addition, the cobalt-copper-tin oxide represented by Formula (1), Formula (2), or Formula (3) has the above-mentioned structures so as to be less likely to collapse during the charge and discharge process, thereby the secondary battery to which the anode material including the said cobalt-copper-tin oxide is applied can maintain good charge-discharge cycle life.

In the present embodiment, the average particle diameter of the cobalt-copper-tin oxide is, for example, between about 10 nm and about 1 mm. If the average particle diameter of the cobalt-copper-tin oxide falls within the above range, it can be advantageous to form an anode with good characteristics. In an embodiment for producing the cobalt-copper-tin oxide by a solid-state method, in order to obtain the above-mentioned cobalt-copper-tin oxide having a specific range of average particle diameter, a mortar, a ball mill, a sand mill, a vibration ball mill or a planet ball mill may be used to perform grinding, but the invention is not limited thereto.

Silicon-Tin-Iron Oxide

In the present embodiment, the silicon-tin-iron oxide may be represented by one of the following Formulae (4) to (6):

$$Si_4Sn_1Fe_{16}MO_{x4} \quad \text{Formula (4)},$$

$$Si_1Sn_1Fe_1MO_{x5} \quad \text{Formula (5)},$$

$$Si_4Sn_1Fe_1MO_{x6} \quad \text{Formula (6)}.$$

In Formula (4), x4 is 21 to 34. In Formula (5), x5 is 3 to 5. In Formula (6), x6 is 6 to 11.5. If x4, x5, and x6 respectively are within the above ranges, a secondary battery to which the anode material including the silicon-tin-iron oxide is applied has excellent capacitance and improved capacity retention.

In each of Formulas (4), (5), and (6), M may be at least one element selected from the group consisting of Cr, Mn, Zn, Al, Ti, In, Mo, and W. The atomic proportion of M is 10 atomic % or less relative to the total number of atoms of the elements other than oxygen element in the silicon-tin-iron oxide represented by Formula (4), Formula (5) or Formula (6). In other words, the silicon-tin-iron oxide represented by Formula (4), Formula (5) or Formula (6) may not contain the element M, but only include four elements, namely silicon, tin, iron and oxygen. It is worth mentioning that, compared with silicon-tin-iron oxides that do not contain the element M, silicon-tin-iron oxides that contain M having an atomic proportion greater than 0 and less than or equal to 10 atomic % have an electrical conductivity increased by about 10% or more. In addition, in the present embodiment, in the case of silicon-tin-iron oxide containing the element M, M may replace a part of silicon, tin, and/or iron. For example, in one embodiment, M may replace a part of silicon; in another embodiment, M may replace a part of silicon and a part of tin; in yet another embodiment, M may replace a part of silicon, a part of tin and a part of iron, but the present invention is not limited thereto. It should be noted that, in the present embodiment, the number of atoms in the silicon-tin-iron oxide represented by Formula (4), Formula (5), or Formula (6) may have an error of ±10% caused by the formation of oxygen vacancies or the nonuniform diffusion.

In the present embodiment, the silicon-tin-iron oxide represented by Formula (4), Formula (5), or Formula (6) may have a Rhombohedral structure, a Cubic Bixbyite structure, a Spinel structure or an Orthorhombic structure. It is worth mentioning that the silicon-tin-iron oxide represented by Formula (4), Formula (5) or Formula (6) allows more oxygen vacancies by having the above-mentioned structures, thereby in the secondary battery to which the anode material including the said silicon-tin-iron oxide is applied, lithium ions can be easily moved in and out quickly, thus effectively improving the lithium ion diffusion rate and the ionic conductivity. In addition, the silicon-tin-iron oxide represented by Formula (4), Formula (5), or Formula (6) has the above-mentioned structures so as to be less likely to collapse during the charge and discharge process, thereby the secondary battery to which the anode material including the said silicon-tin-iron oxide is applied can maintain good charge-discharge cycle life.

In the present embodiment, the average particle diameter of the silicon-tin-iron oxide is, for example, between about 10 nm and about 1 mm. If the average particle diameter of the silicon-tin-iron oxide falls within the above range, it can be advantageous to form an anode with good characteristics. In the embodiment of manufacturing the silicon-tin-iron oxide by a solid-state method, in order to obtain the above-mentioned silicon-tin-iron oxide having a specific range of average particle diameter, a mortar, a ball mill, a sand mill, a vibrating ball mill or a planet ball mill may be used to perform grinding, but the invention is not limited thereto.

Copper-Manganese-Silicon Oxide

In the present embodiment, the copper-manganese-silicon oxide may be represented by the following Formula (7):

$$Cu_{x7}Mn_{7-x7}SiMO_{12} \quad \text{Formula (7)}.$$

In Formula (7), x7 is greater than 0 and less than or equal to 1. If x7 is within the above range, a secondary battery to which the anode material including the copper-manganese-silicon oxide is applied has excellent capacitance and improved capacity retention.

In Formula (7), M may be at least one element selected from the group consisting of Cr, Sn, Ni, Co, Zn, Al, Ti, In, Mo, and W. The atomic proportion of M is 10 atomic % or less relative to the total number of atoms of the elements other than oxygen element in the copper-manganese-silicon oxide represented by Formula (7). In other words, the copper-manganese-silicon oxide represented by Formula (7) may not contain the element M, but only includes four elements, namely copper, manganese, silicon, and oxygen. It is worth mentioning that, compared with copper-manganese-silicon oxides that do not contain the element M, copper-manganese-silicon oxides that contain M with an atomic proportion greater than 0 and less than or equal to 10 atomic % have an electrical conductivity increased by about 10% or more. In addition, in the present embodiment, in the case of copper-manganese-silicon oxide containing the element M, M may replace a part of copper, manganese, and/or silicon. For example, in one embodiment, M may replace a part of copper; in another embodiment, M may replace a part of copper and a part of manganese; in yet another embodiment, M may replace a part of copper, a part of manganese and a part of silicon, but the present invention is not limited thereto. It should be noted that, in the present embodiment, the number of atoms in the copper-manganese-silicon oxide represented by Formula (7) may have an error of ±10% due to nonuniform diffusion or the formation of oxygen vacancies, thereby forming a nonstoichiometric compound.

In the present embodiment, the copper-manganese-silicon oxide represented by the Formula (7) may have an Abswurmbachite structure, a Pyroxmangite structure or a Braunite structure. It is worth mentioning that the copper-manganese-silicon oxide represented by the Formula (7) has the above-mentioned structure, and thus in the secondary battery to which the anode material including the said copper-manganese-silicon oxide is applied, the energy loss caused by the overpotential can be reduced, the lithium ion diffusion rate and the ionic conductivity can be improved, and the charge-discharge cycle life can be improved.

In the present embodiment, the average particle diameter of the copper-manganese-silicon oxide is, for example, between about 10 nm and about 1 mm. If the average particle diameter of the copper-manganese-silicon oxide falls within the above range, it can be beneficial to form n anode with good characteristics. In an embodiment for producing the copper-manganese-silicon oxide by a solid-state method, in order to obtain the copper-manganese-silicon oxide having a specific range of average particle diameter, a mortar, a ball mill, a sand mill, a vibrating ball mill or a planet ball mill may be used to perform grinding, but the invention is not limited thereto.

Tin-Manganese-Nickel Oxide

In the present embodiment, the tin-manganese-nickel oxide may be represented by one of the following Formulae (8) to (11):

$$Sn_1Mn_2Ni_1MO_{x8} \quad \text{Formula (8),}$$

$$Sn_1Mn_1Ni_2MO_{x9} \quad \text{Formula (9),}$$

$$Sn_2Mn_1Ni_1MO_{x10} \quad \text{Formula (10),}$$

$$Sn_1Mn_1Ni_1MO_{x11} \quad \text{Formula (11).}$$

In Formula (8), x8 is 4 to 7. In Formula (9), x9 is 4 to 7. In Formula (10), x10 is 4 to 7. In Formula (11), x11 is 3 to 6. If x8, x9, x10, and x11 respectively are within the above ranges, a secondary battery to which the anode material including the tin-manganese-nickel oxide is applied has excellent capacitance and improved capacity retention.

In each of Formula (8), Formula (9), Formula (10), and Formula (11), M may be at least one element selected from the group consisting of Cr, Mn, Zn, Al, Ti, In, Mo, and W. The atomic proportion of M is 10 atomic % or less relative to the total number of atoms of the metal elements in the tin-manganese-nickel oxide represented by Formula (8), Formula (9), Formula (10), or Formula (11). In other words, the tin-manganese-nickel oxide represented by Formula (8), Formula (9), Formula (10), or Formula (11) may not contain the element M, but only include four elements, namely tin, manganese, nickel, and oxygen. It is worth mentioning that, compared with tin-manganese-nickel oxides that do not contain the element M, tin-manganese-nickel oxides containing M having an atomic proportion greater than 0 and less than or equal to 10 atomic % have an increase in electrical conductivity of about 10% or more. In addition, in the present embodiment, in the case of tin-manganese-nickel oxide containing the element M, M may replace a part of tin, manganese, and/or nickel. For example, in one embodiment, M may replace a part of tin; in another embodiment, M may replace a part of tin and a part of manganese; in yet another embodiment, M may replace a part of tin, a part of manganese and a part of nickel, but the present invention is not limited thereto. It should be noted that, in the present embodiment, the number of atoms in the tin-manganese-nickel oxide represented by Formula (8), Formula (9), Formula (10), or Formula (11) may have an error of ±10% due to the formation of oxygen vacancies or nonuniform diffusion.

In the present embodiment, the tin-manganese-nickel oxide represented by Formula (8), Formula (9), Formula (10), or Formula (11) may have a Spinel structure, a Rutile structure, or a Rock salt structure. It is worth mentioning that the tin-manganese-nickel oxide represented by Formula (8), Formula (9), Formula (10) or Formula (11) allows more oxygen vacancies by having the above-mentioned structures, thereby in the secondary battery to which the anode material including the said tin-manganese-nickel oxide is applied, lithium ions can be easily moved in and out quickly, thereby effectively improving the lithium ion diffusion rate and the ionic conductivity. In addition, the tin-manganese-nickel oxide represented by Formula (8), Formula (9), Formula (10), or Formula (11) has the above-mentioned structures so as to be not easily collapsed during the charge and discharge process, thereby the secondary battery to which the anode material including the tin-manganese-nickel oxide is applied can maintain good charge-discharge cycle life.

In the present embodiment, the average particle diameter of the tin-manganese-nickel oxide is, for example, between about 10 nm and about 1 mm. If the average particle diameter of the tin-manganese-nickel oxide falls within the above range, it can be advantageous to form an anode with good characteristics. In the embodiment of producing the tin-manganese-nickel oxide by a solid-state method, in order to obtain the tin-manganese-nickel oxide having a specific range of average particle diameter as described above, a mortar, a ball mill, a sand mill, a vibrating ball mill or a planet ball mill may be used to perform grinding, but the invention is not limited thereto.

Manganese-Copper-Nickel Oxide

In the present embodiment, the manganese-copper-nickel oxide may be represented by one of the following Formulae (12) to (14):

$$Mn_3Cu_2Ni_1MO_8 \quad \text{Formula (12),}$$

$$Mn_2Cu_1Ni_1MO_4 \quad \text{Formula (13),}$$

$$Mn_1Cu_1Ni_1MO_4 \quad \text{Formula (14).}$$

That is, in the present embodiment, the atomic ratio of manganese to copper to nickel to oxygen in the manganese-copper-nickel oxide may be 3:2:1:8, 2:1:1:4, or 1:1:1:4. It is worth mentioning that the manganese-copper-nickel oxide is represented by one of the Formulae (12) to (14), whereby the secondary battery to which the anode material including the said manganese-copper-nickel oxide is applied has excellent capacitance and improved capacity retention.

In each of Formulas (12), (13), and (14), M may be at least one element selected from the group consisting of Fe, Cr, Zn, Al, Ti, In, Mo, W, and Si. The atomic proportion of M is 10 atomic % or less relative to the total number of atoms of the metal elements in the manganese-copper-nickel oxide represented by Formula (12), Formula (13) or Formula (14). In other words, the manganese-copper-nickel oxide represented by Formula (12), Formula (13) or Formula (14) may not contain the element M, but only include four elements, namely manganese, copper, nickel and oxygen. It is worth mentioning that, compared with manganese-copper-nickel oxides which do not contain the element M, manganese-copper-nickel oxides containing M having an atomic proportion greater than 0 and less than or equal to 10 atomic % have an electrical conductivity increased by about 10% or more. In addition, in the present embodiment, in the case of manganese-copper-nickel oxide containing the element M, M may replace a part of manganese, copper, and/or nickel. For example, in one embodiment, M may replace a part of manganese; in another embodiment, M may replace a part of manganese and a part of copper; in yet another embodiment, M may replace a part of manganese, a part of copper and a part of nickel, but the present invention is not limited thereto. It should be noted that, in the present embodiment, the number of atoms in the manganese-copper-nickel oxide represented by Formula (12), Formula (13) or Formula (14) may be have an error of ±10% due to the formation of oxygen vacancies or nonuniform diffusion.

In the present embodiment, the manganese-copper-nickel oxide represented by Formula (12), Formula (13), or Formula (14) may have a Tetragonal structure, a Spinel structure, a Perovskite structure, or a Chalcopyrite structure. It is worth mentioning that the manganese-copper-nickel oxide represented by Formula (12), Formula (13), or Formula (14) allows more oxygen vacancies by having the above-mentioned structure, thereby in the secondary battery to which the anode material including the said manganese-copper-nickel oxide is applied, lithium ions can be easily moved in and out quickly, thereby effectively improving the lithium ion diffusion rate and the ionic conductivity. In addition, the manganese-copper-nickel oxide represented by Formula (12), Formula (13), or Formula (14) has the above-mentioned structures so as to be not easily collapse during the charge and discharge process, thereby the secondary battery to which the anode material including the manganese-copper-nickel oxide is applied can maintain good charge-discharge cycle life.

In the present embodiment, the average particle diameter of the manganese-copper-nickel oxide is, for example, between about 10 nm and about 1 mm. If the average particle diameter of the manganese-copper-nickel oxide falls within the above range, it can be beneficial to form an anode with good characteristics. In an embodiment for producing the manganese-copper-nickel oxide by a solid-state method, in order to obtain the above-mentioned manganese-copper-nickel oxide having a specific average particle diameter, a mortar, a ball mill, a sand mill, a vibration ball mill or a planet ball mill may be used to perform grinding, but the invention is not limited thereto.

Nickel-Copper-Tin Oxide

In the present embodiment, the nickel-copper-tin oxide may be represented by one of the following Formulae (15) to (17):

$$NiCuSn_2MO_{x15} \qquad \text{Formula (15),}$$

$$Ni_2CuSn_3MO_{x16} \qquad \text{Formula (16),}$$

$$NiCu_2Sn_3MO_{x17} \qquad \text{Formula (17).}$$

In Formula (15), x15 is 3, 6 or 9. In Formula (16), x16 is 4, 6, or 9. In Formula (17), x17 is 4, 6, or 9. If x15, x16, and x17 respectively meet the specific values listed above, a secondary battery to which the anode material including the nickel-copper-tin oxide is applied has excellent capacitance and improved capacity retention.

In each of Formulas (15), (16), and (17), M may be at least one element selected from the group consisting of Cr, Mn, Zn, Al, Ti, In, Mo, W, and Co. The atomic proportion of M is 10 atomic % or less relative to the total number of atoms of the metal elements in the nickel-copper-tin oxide represented by Formula (15), Formula (16) or Formula (17). In other words, the nickel-copper-tin oxide represented by Formula (15), Formula (16) or Formula (17) may not contain the element M, but only include four elements, namely nickel, copper, tin and oxygen. It is worth mentioning that, compared to nickel-copper-tin oxides containing no element M, nickel-copper-tin oxides containing M having an atomic proportion greater than 0 and less than or equal to 10 atomic % have an electrical conductivity increased by about 15% or more. In addition, in the present embodiment, in the case of nickel-copper-tin oxide containing the element M, M may replace a part of nickel, copper, and/or tin. For example, in one embodiment, M may replace a portion of nickel; in another embodiment, M may replace a part of nickel and a part of copper; in yet another embodiment, M may replace a part of nickel, a part of copper and a part of tin, but the invention is not limited thereto. It should be noted that, in the present embodiment, the number of atoms in the nickel-copper-tin oxide represented by Formula (15), Formula (16), or Formula (17) may have an error of ±10% caused by the formation of oxygen vacancies or the nonuniform diffusion.

In the present embodiment, the nickel-copper-tin oxide represented by Formula (15), Formula (16), or Formula (17) may have a Perovskite structure, a Sodium chloride structure, or Chalcopyrite structure. It is worth mentioning that the nickel-copper-tin oxide represented by Formula (15), Formula (16), or Formula (17) allows more oxygen vacancies by having the above-mentioned structures, thereby in the secondary battery to which the anode material including the said nickel-copper-tin oxide is applied, lithium ions can be easily moved in and out quickly, thus effectively improving lithium ion diffusion rate and the ionic conductivity. In addition, the nickel-copper-tin oxide represented by Formula (15), Formula (16), or Formula (17) has the above-mentioned structures so as to be less likely to collapsed during the charge and discharge process, thereby the secondary battery to which the anode material including the said nickel-copper-tin oxide is applied can maintain good charge-discharge cycle life.

In the present embodiment, the average particle diameter of the nickel-copper-tin oxide is, for example, between about 10 nm and about 1 mm. If the average particle diameter of the nickel-copper-tin oxide falls within the above range, it can be beneficial to form an anode with good characteristics. In the embodiment of producing the nickel-copper-tin oxide by a solid-state method, in order to obtain the nickel-copper-tin oxide having a specific range of average particle diameter as described above, a mortar, a ball mill, a sand mill, a vibrating ball mill or a planet ball mill may be used to perform grinding, but the invention is not limited thereto.

In addition, in the present embodiment, the method for preparing the oxide mixture containing four or more than four elements includes, for example, performing a mixing step. The mixing step is performed by, for example, a physical dry mixing method or a physical wet mixing method, but the present invention is not limited thereto. In an embodiment using a physical dry mixing method to prepare the oxide mixture containing four or more than four elements, the mixing temperature may be room temperature, for example, about 25° C. or more. In an embodiment using a physical wet mixing method to prepare the oxide mixture containing four or more than four elements, the mixing temperature may be room temperature, for example, about 25° C. or more, and the solvent may be water, alcohol, acetone, or methanol.

In the present embodiment, the oxide mixture containing four or more than four elements may include an oxide mixture containing cobalt, copper and tin, an oxide mixture containing silicon, tin and iron, and an oxide mixture containing copper, manganese and silicon, an oxide mixture containing tin, manganese and nickel, an oxide mixture containing manganese, copper and nickel, or an oxide mixture containing nickel, copper and tin. In the following, the above-mentioned various oxide mixtures will be described in detail.

Oxide Mixture Containing Cobalt, Copper and Tin

In the present embodiment, the oxide mixture containing cobalt, copper and tin may be obtained by performing a mixing step of at least one of $Co_3O_4$, $Co_2O_3$ and CoO, at least one of CuO and $Cu_2O$, and at least one of SnO and $SnO_2$. That is, the oxide mixture containing cobalt, copper and tin can be obtained by a mixing step of cobalt oxide, copper oxide, and tin oxide. In addition, in the present embodiment, the atomic ratio of cobalt to copper to tin in the oxide mixture containing cobalt, copper and tin may be 5:1:3, 2:1:1:1, or 1:1:1. If the atomic ratio of cobalt, copper and tin meets the specific ratios listed above, a secondary battery to which the anode material including the oxide mixture containing cobalt, copper and tin is applied has excellent capacitance and improved capacity retention.

In the present embodiment, during the mixing step, an oxide containing M may optionally be mixed together with at least one of $Co_3O_4$, $Co_2O_3$ and CoO, at least one of CuO and $Cu_2O$, and at least one of SnO and $SnO_2$, wherein M is at least one element selected from the group consisting of Ni, Cr, Mn, Zn, Al, Ti, In, Mo, and W. That is, the oxide mixture containing cobalt, copper and tin may optionally include the element M. Relative to the total number of atoms of the metal elements in the oxide mixture containing cobalt, copper and tin, the atomic proportion of M is greater than 0 to less than or equal to 10 atomic %. It is worth mentioning that compared with an oxide mixture containing cobalt, copper and tin that is not mixed with an oxide containing M, an oxide mixture containing cobalt, copper and tin that is mixed with an oxide containing M and the atomic proportion of M is greater than 0 and less than or equal to 10 atomic % has an increase in electrical conductivity of about 8% or more. It should be noted that in the present embodiment, the numerical value of the atomic ratio of the elements in the oxide mixture containing cobalt, copper and tin may have an error of ±10% due to the formation of oxygen vacancies or nonuniform diffusion.

In the present embodiment, an anode is made by using an anode material including the oxide mixture containing cobalt, copper and tin, whereby lithium ions can be moved in and out through different paths, so that the polarization effect can be reduced, and the charge-discharge cycle life can be improved. In this way, the capacity of a secondary battery to which the anode material including the oxide mixture containing cobalt, copper and tin is applied can be significantly increased. In addition, tin oxide used as an anode material can achieve high capacitance performance, copper oxide used as an anode material can achieve good cycle life, and cobalt oxide used as an anode material can achieve good lithium ion conductivity, so a secondary battery to which the anode material including the oxide mixture obtained by the mixing step of cobalt oxide, copper oxide, and tin oxide is applied can have excellent performance and safety.

Oxide Mixture Containing Silicon, Tin and Iron

In the present embodiment, the oxide mixture containing silicon, tin and iron may be obtained by performing a mixing step of at least one of $SiO_2$ and SiO, at least one of SnO and $SnO_2$, and at least one of $Fe_2O_3$, $Fe_3O_4$ and FeO. That is, the oxide mixture containing silicon, tin and iron oxides can be obtained by a mixing step of silicon oxide, tin oxide, and iron oxide. In addition, in the present embodiment, the atomic ratio of silicon to tin to iron in the oxide mixture containing silicon, tin and iron may be 4:1:16, 1:1:1, or 4:1:1. If the atomic ratio of silicon, tin and iron meets the specific ratios listed above, a secondary battery using the anode material including the oxide mixture containing silicon, tin and iron has excellent capacitance and improved capacity retention.

In the present embodiment, at the time of performing the mixing step, an oxide containing M may optionally be mixed together with at least one of $SiO_2$ and SiO, at least one of SnO and $SnO_2$, and at least one of $Fe_2O_3$, $Fe_3O_4$ and FeO, wherein M is at least one element selected from the group consisting of Cr, Mn, Zn, Al, Ti, In, Mo and W. That is, the oxide mixture containing silicon, tin and iron may optionally include the element M. Relative to the total number of atoms of the elements other than oxygen element in the oxide mixture containing silicon, tin and iron, the atomic proportion of M is greater than 0 to less than or equal to 10 atomic %. It is worth mentioning that compared with an oxide mixture containing silicon, tin and iron that is not mixed with an oxide containing M, an oxide mixture containing silicon, tin and iron that is mixed with an oxide containing M and the atomic proportion of M is greater than 0 to less than or equal to 10 atomic % has an increase in electrical conductivity of about 10% or more. It should be noted that in the present embodiment, the numerical value of the atomic ratio of the elements in the oxide mixture containing silicon, tin and iron may have an error of ±10% due to the formation of oxygen vacancies or nonuniform diffusion.

In the present embodiment, an anode is made by using an anode material including the oxide mixture containing silicon, tin and iron, whereby lithium ions can be moved in and out through different paths, so that the polarization effect can be reduced, and the charge-discharge cycle life can be improved. In this way, the capacity of a secondary battery to which the anode material including the oxide mixture containing silicon, tin and iron is applied can be significantly increased. In addition, tin oxide used as an anode material can achieve high capacitance performance, iron oxide used as an anode material can achieve good cycle life, and silicon oxide used as an anode material can achieve good lithium ion conductivity, so a secondary battery to which the anode material including the oxide mixture obtained by the mixing step of silicon oxide, tin oxide, and iron oxide can have excellent performance and safety.

Oxide Mixture Containing Copper, Manganese and Silicon

In the present embodiment, the oxide mixture containing copper, manganese and silicon may be obtained by performing a mixing step of at least one of CuO and $Cu_2O$, at least one of $SiO_2$ and SiO, and at least one of MnO, $MnO_2$, $Mn_2O_3$ and $Mn_3O_4$. In other words, the oxide mixture containing copper, manganese and silicon can be obtained by a mixing step of copper oxide, manganese oxide, and silicon oxide. In addition, in the present embodiment, the atomic ratio of copper to manganese to silicon in the oxide mixture containing copper, manganese and silicon may be 1:1:1, 1:4:1, 4:1:1, or 1:1:4. If the atomic ratio of copper, manganese and silicon meets the specific ratios listed above, a secondary battery using the anode material including the oxide mixture containing copper, manganese and silicon has excellent capacitance and improved capacity retention.

In the present embodiment, when the mixing step is performed, an oxide containing M may optionally be mixed together with at least one of CuO and $Cu_2O$, at least one of $SiO_2$ and SiO, and at least one of MnO, $MnO_2$, $Mn_2O_3$ and $Mn_3O_4$, wherein M is at least one element selected from the group consisting of Cr, W, Sn, Ni, Zn, Al, Ti, In and Mo. That is, the oxide mixture containing copper, manganese and silicon may optionally include the element M. Relative to the total number of atoms of the elements other than oxygen element in the oxide mixture containing copper, manganese and silicon, the atomic proportion of M is greater than 0 to less than or equal to 10 atomic %. It is worth mentioning that compared with an oxide mixture containing copper, manganese and silicon that is not mixed with an oxide containing M, an oxide mixture containing copper, manganese and silicon that is mixed with an oxide containing M and the atomic proportion of M is greater than 0 to less than or equal to 10 atomic % has an increase in electrical conductivity of about 10% or more. It should be noted that, in the present embodiment, the numerical value of the atomic ratio of the elements in the oxide mixture containing copper, manganese and silicon may have an error of ±10% due to the formation of oxygen vacancies or nonuniform diffusion.

In the present embodiment, the oxide mixture containing copper, manganese and silicon obtained by performing a mixing step of copper oxide, manganese oxide and silicon oxide brings the synergistic effect due to the interaction between the multiple oxides, such that the capacity of a secondary battery to which the anode material including the oxide mixture containing copper, manganese and silicon is applied can be significantly increased. In addition, in the present embodiment, an anode is made by using an anode material including the oxide mixture containing copper, manganese and silicon, whereby lithium ions can be moved in and out through different paths, so that the polarization effect can be reduced and the charge-discharge cycle life can be increased. In addition, copper oxide used as an anode material can achieve good cycle life, manganese oxide used as an anode material can achieve low overpotential, and silicon oxide used as an anode material can achieve good lithium ion conductivity, so a secondary battery to which the anode material including the oxide mixture obtained by the mixing step of copper oxide, manganese oxide, and silicon oxide is applied can have excellent performance and safety.

Oxide Mixture Containing Tin, Manganese and Nickel

In the present embodiment, the oxide mixture containing tin, manganese and nickel may be obtained by performing a mixing step of at least one of $SnO$ and $SnO_2$, at least one of $MnO$, $MnO_2$, $Mn_2O_3$ and $Mn_3O_4$, and at least one of $NiO$ and $Ni_2O_3$. In other words, the oxide mixture of tin, manganese and nickel can be obtained by a mixing step of tin oxide, manganese oxide, and nickel oxide. In addition, in the present embodiment, the atomic ratio of tin to manganese to nickel in the oxide mixture containing tin, manganese and nickel may be 1:2:1, 1:1:1, 1:1:2, or 2:1:1. If the atomic ratio of tin, manganese and nickel meets the specific ratios listed above, a secondary battery to which the anode material including the oxide mixture containing tin, manganese and nickel is applied has excellent capacitance and improved capacity retention.

In the present embodiment, at the time of performing the mixing step, an oxide containing M may optionally be mixed together with at least one of $SnO$ and $SnO_2$, at least one of $MnO$, $MnO_2$, $Mn_2O_3$ and $Mn_3O_4$, and at least one of $NiO$ and $Ni_2O_3$, wherein M is at least one element selected from the group consisting of Cr, W, Si, Cu, Zn, Al, Ti, In and Mo. That is, the oxide mixture containing tin, manganese and nickel may optionally include the element M. Relative to the total number of atoms of the metal elements in the oxide mixture containing tin, manganese and nickel, the atomic proportion of M is greater than 0 to less than or equal to 10 atomic %. It is worth mentioning that compared with an oxide mixture containing tin, manganese and nickel that is not mixed with an oxide containing M, an oxide mixture containing tin, manganese and nickel that is mixed with the oxide containing M and the atomic proportion of M is greater than 0 to less than or equal to 10 atomic % has an increase in electrical conductivity of about 10% or more. It should be noted that, in the present embodiment, the numerical value of the atomic ratio of the elements in the oxide mixture containing tin, manganese and nickel may have an error of ±10% due to the formation of oxygen vacancies or nonuniform diffusion.

In the present embodiment, the oxide mixture containing tin, manganese and nickel obtained by performing a mixing step of tin oxide, manganese oxide, and nickel oxide brings the synergistic effect due to the interaction between the multiple oxides, such that the capacity of a secondary battery to which the anode material including the oxide mixture containing tin, manganese and nickel is significantly increased. In addition, in the present embodiment, an anode is made by using an anode material including the oxide mixture containing tin, manganese and nickel, whereby lithium ions can be moved in and out through different paths, so that the polarization effect can be reduced and charge-discharge cycle life can be increased. In addition, tin oxide used as an anode material can achieve high capacitance performance, manganese oxide used as an anode material can achieve low overpotential, and nickel oxide used as an anode material can achieve good lithium ion conductivity, so a secondary battery using the anode material including the oxide mixture obtained by the mixing step of tin oxide, manganese oxide, and nickel oxide can have excellent performance and safety.

Oxide Mixture Containing Manganese, Copper and Nickel

In the present embodiment, the oxide mixture containing manganese, copper and nickel may be obtained by performing a mixing step of at least one of $MnO$, $MnO_2$, $Mn_2O_3$ and $Mn_3O_4$, at least one of $CuO$ and $Cu_2O$, and at least one of $NiO$ and $Ni_2O_3$. That is to say, the oxide mixture containing manganese, copper and nickel can be obtained by a mixing step of manganese oxide, copper oxide, and nickel oxide. In addition, in the present embodiment, the atomic ratio of manganese to copper to nickel in the oxide mixture containing manganese, copper and nickel may be 3:2:1, 2:1:1, or 1:1:1. If the atomic ratio of manganese, copper and nickel meets the specific ratios listed above, a secondary battery to which the anode material including the oxide mixture containing manganese, copper and nickel is applied has excellent capacitance and improved capacity retention.

In the present embodiment, when the mixing step is performed, an oxide containing M may optionally be mixed together with at least one of $MnO$, $MnO_2$, $Mn_2O_3$ and $Mn_3O_4$, at least one of $CuO$ and $Cu_2O$, and at least one of $NiO$ and $Ni_2O_3$, wherein M is at least one element selected from the group consisting of Fe, Cr, Zn, Al, Ti, In, Mo, W, and Si. That is, the oxide mixture containing manganese, copper and nickel may optionally include the element M. Relative to the total number of atoms of the metal elements in the oxide mixture containing manganese, copper and tin, the atomic proportion of M is greater than 0 to less than or equal to 10 atomic %. It is worth mentioning that compared with an oxide mixture containing manganese, copper and nickel which is not mixed with an oxide containing M, an oxide mixture containing manganese, copper and nickel that is mixed with the oxide containing M and the atomic proportion of M is greater than 0 to less than or equal to 10 atomic % has an increase in electrical conductivity of about 5% or more. It should be noted that, in the present embodiment, the numerical value of the atomic ratio of the elements in the oxide mixture containing manganese, copper and nickel may have an error of ±10% due to the formation of oxygen vacancies or nonuniform diffusion.

In the present embodiment, an anode is made by using an anode material including the oxide mixture containing manganese, copper and nickel, whereby lithium ions can be moved in and out through different paths, so that the polarization effect can be reduced, and the charge-discharge cycle life can be improved. In addition, manganese oxide used as an anode material can achieve low overpotential, copper oxide used as an anode material can achieve good cycle life, and nickel oxide used as an anode material can achieve high capacitance performance, so a secondary battery using the anode material including the oxide mixture obtained by the mixing step of manganese oxide, copper oxide, and nickel oxide can have excellent performance and safety.

Oxide Mixture Containing Nickel, Copper and Tin

In the present embodiment, the oxide mixture containing nickel, copper and tin may be obtained by performing a mixing step of at least one of $Ni_2O_3$ and NiO, at least one of CuO and $Cu_2O$, and at least one of SnO and $SnO_2$. That is, the oxide mixture containing nickel, copper and tin can be obtained by a mixing step of nickel oxide, copper oxide, and tin oxide. In addition, in the present embodiment, the atomic ratio of nickel to copper to tin in the oxide mixture containing nickel, copper and tin may be 1:1:2, 2:1:3, or 1:2:3. If the atomic ratio of nickel, copper and tin meets the specific ratios listed above, a secondary battery using the anode material including the oxide mixture containing nickel, copper and tin has excellent capacitance and improved capacity retention.

In the present embodiment, at the time of performing the mixing step, an oxide containing M may optionally be mixed together with at least one of $Ni_2O_3$ and NiO, at least one of CuO and $Cu_2O$, and at least one of SnO and $SnO_2$, wherein M is at least one element selected from the group consisting of Cr, Mn, Zn, Al, Ti, In, Mo, W, and Co. That is, the oxide mixture containing nickel, copper, and tin may optionally include the element M. The atomic proportion of M is greater than 0 to less than or equal to 10 atomic % relative to the total number of atoms of the metal elements in the oxide mixture containing nickel, copper and tin. It is worth mentioning that compared with an oxide mixture containing nickel, copper and tin which is not mixed with an oxide containing M, an oxide mixture containing nickel, copper and tin that is mixed with the oxide containing M and the atomic proportion of M is greater than 0 to less than or equal to 10 atomic % has an increase in electrical conductivity of about 8% or more. It should be noted that, in the present embodiment, the numerical value of the atomic ratio of the elements in the oxide mixture containing nickel, copper and tin may have an error of ±10% due to the formation of oxygen vacancies or nonuniform diffusion.

In the present embodiment, an anode is made by using an anode material including the oxide mixture containing nickel, copper and tin, whereby lithium ions can be moved in and out through different paths, so that the polarization effect can be reduced, and the charge-discharge cycle life can be improved. In this way, the capacity of a secondary battery to which the anode material including the oxide mixture containing nickel, copper and tin is applied can be significantly increased. In addition, tin oxide used as an anode material can achieve high capacitance performance, copper oxide used as an anode material can achieve good cycle life, and nickel oxide used as an anode material can achieve good lithium ion conductivity, so a secondary battery to which the anode material including the oxide mixture obtained by the mixing step of nickel oxide, copper oxide, and tin oxide can have excellent performance and safety.

Another embodiment of the present invention provides a secondary battery using any of the anode materials proposed in the foregoing embodiments.

FIG. 1 is a schematic cross-sectional view of a secondary battery according to an embodiment of the present invention. Please refer to FIG. 1, a secondary battery 100 may include an anode 102, a cathode 104, an electrolyte 108 and a package structure 112. In the present embodiment, the secondary battery 100 may further include a separator 106. In addition, in the present embodiment, the secondary battery 100 may be a lithium-ion battery.

In the present embodiment, the anode 102 may include a current collector 102a and an anode material layer 102b disposed on the current collector 102a. In the present embodiment, the current collector 102a may be a metal foil, such as a copper foil, a nickel foil, or a highly conductive foil. In the present embodiment, the thickness of the current collector 102a may be between about 5 μm and about 300 μm.

In the present embodiment, the anode material layer 102b includes any of the anode materials proposed in the foregoing embodiments. In the present embodiment, the anode material may be disposed on the current collector 102a through, for example, coating, sputtering, hot pressing, sintering, physical vapor deposition, or chemical vapor deposition. In addition, in the present embodiment, the anode material layer 102b may further include a conductive agent and a binder. In the present embodiment, the conductive agent may be natural graphite, artificial graphite, carbon black, conductive black (such as VGCF, Super P, KS4, KS6, or ECP), acetylene black, Ketjen black, carbon whisker, carbon fiber, metal powder, metal fiber, or ceramics material. In detail, the conductive agent is used to improve the electrical contact between the molecules of the anode material. In the present embodiment, the binder may be polyvinylidene fluoride (PVDF), styrene butadiene rubber (SBR), polyamide, melamine resin, or a combination thereof. In detail, the anode material may be adhered to the current collector 102a by the binder.

In the present embodiment, the cathode 104 and the anode 102 are arranged separately. In the present embodiment, the cathode 104 includes a current collector 104a and a cathode material layer 104b disposed on the current collector 104a. In the present embodiment, the current collector 104a may be a metal foil, such as a copper foil, a nickel foil, an aluminum foil, or a highly conductive foil. In the present embodiment, the thickness of the current collector 104a may be between about 5 μm and about 300 μm.

In the present embodiment, the cathode material layer 104b includes a cathode material. In the present embodiment, the cathode material may include lithium cobalt oxide ($LiCoO_2$), lithium manganate ($LiMn_2O_4$), lithium nickelate ($LiNiO_2$), lithium iron phosphate ($LiFePO_4$), or a combination thereof. In the present embodiment, the cathode material can be disposed on the current collector 104a by, for example, coating, sputtering, hot pressing, sintering, physical vapor deposition, or chemical vapor deposition. In addition, in the present embodiment, the cathode material layer 104b may further include a binder. In the present embodiment, the binder may be PVDF, SBR, polyamide, melamine resin, or a combination thereof. In detail, the cathode material can be adhered to the current collector 104a by the binder.

In the present embodiment, the electrolyte 108 is provided between the anode 102 and the cathode 104. The electrolyte 108 may include a liquid electrolyte, a gel electrolyte, a molten salt electrolyte, or a solid electrolyte.

In the present embodiment, the separator 106 is disposed between the anode 102 and the cathode 104, the separator 106, the anode 102 and the cathode 104 define a housing region 110, and the electrolyte 108 is disposed in the housing region 110. In the present embodiment, the material of the separator 106 may be an insulating material, such as polyethylene (PE), polypropylene (PP), or a composite structure composed of the above materials (e.g., PE/PP/PE).

In the present embodiment, the secondary battery 100 includes the separator 106 to isolate the anode 102 from the cathode 104 and allow ions to penetrate, but the invention is not limited thereto. In other embodiments, the electrolyte 108 is a solid electrolyte, and the secondary battery 100 does not include a separator.

In the present embodiment, the package structure 112 covers the anode 102, the cathode 104, and the electrolyte 108. In the present embodiment, the material of the package structure 112 is, for example, aluminum foil or stainless steel.

In the present embodiment, the structure of the secondary battery 100 is not limited to that shown in FIG. 1. In other embodiments, the secondary battery 100 may have a roll-type structure in which an anode, a cathode, and a separator provided as needed are wound, or a laminated structure formed by laminating flat layers. In addition, in the present embodiment, the secondary battery 100 is, for example, a paper-type battery, a button-type battery, a coin-type battery, a laminated battery, a cylindrical battery, or a rectangular battery.

In particular, the anode 102 of the secondary battery 100 uses any of the anode materials proposed in the foregoing embodiments, so as described above, the secondary battery 100 can have good capacitance, stability, and charge-discharge cycle life.

The features of the present invention are described in more detail below with reference to Examples 1 to 14 and Comparative Examples 1 to 9. Although the following Examples 1 to 14 are described, the material used, the amount and ratio of each thereof, as well as the detailed process flow, etc. can be suitably modified without departing from the scope of this disclosure. Therefore, the scope of this disclosure should not be limited by the following embodiments.

Example 1

Preparation of Anode Material

At room temperature, a ball mill was used to grind CoO powder (precursor containing cobalt), CuO powder (precursor containing copper), SnO powder (precursor containing tin), and W oxide powder (precursor containing element M), and then the resulted powders were mixed and pressed into a green pellet having a diameter of about 1 cm. The green pellet was placed in a high-temperature furnace to obtain the bulk material of the cobalt-copper-tin oxide represented by the aforementioned Formula (1) (i.e., the anode material of Example 1), wherein x1 is 8, the element M is W, the atomic proportion of the element M is about 1 to 10 atomic %, and the average particle diameter of the cobalt-copper-tin oxide ranges from about 0.1 μm to about 10 μm.

Preparation of Secondary Battery

The crushed and ground anode material of Example 1, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. After that, the dried copper foil was cut into the anode of Example 1 with a diameter of about 12.8 mm by a cutting machine.

A button-type battery (model: CR2032) was assembled, which uses the anode of Example 1 as the working electrode, lithium metal as the counter electrode, 1M $LiPF_6$ added to an organic solvent as the electrolyte, a polypropylene film (trade name: Celgard #2400, made by Celgard) as the separator and stainless steel 304 or 316 cover as the package structure. So far, the secondary battery of Example 1 was prepared.

Example 2

Preparation of Anode Material

At room temperature, a ball mill was used to grind CoO powder (precursor containing cobalt), CuO powder (precursor containing copper), SnO powder (precursor containing tin), and W oxide powder (precursor containing element M), and then the resulted powders were mixed and pressed into a green pellet having a diameter of about 1 cm. The green pellet was placed in a high-temperature furnace to obtain the bulk material of the cobalt-copper-tin-oxide represented by the aforementioned Formula (2) (i.e., the anode material of Example 2), wherein x2 is 4, the element M is W, the atomic proportion of the element M is about 1 to 10 atomic %, and the average particle diameter of the cobalt-copper-tin oxide ranges from about 0.1 μm to about 10 μm.

Preparation of Secondary Battery

The crushed and ground anode material of Example 2, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. After that, the dried copper foil was cut into the anode of Example 2 having a diameter of about 12.8 mm by a cutting machine.

A button-type battery (model: CR2032) was assembled, which uses the anode of Example 2 as the working electrode, lithium metal as the counter electrode, 1M $LiPF_6$ added to an organic solvent as the electrolyte, a polypropylene film (trade name: Celgard #2400, made by Celgard) as the separator and stainless steel 304 or 316 cover as the package structure. So far, the secondary battery of Example 2 was prepared.

Example 3

Preparation of Anode Material

At room temperature, a ball mill was used to grind CoO powder (precursor containing cobalt), CuO powder (precursor containing copper), SnO powder (precursor containing tin), and W oxide powder (precursor containing element M), and then the resulted powders were mixed and pressed into a green pellet having a diameter of about 1 cm. The green pellet was placed in a high-temperature furnace to obtain the bulk material of the cobalt-copper-tin-oxide bulk represented by the foregoing Formula (3) (i.e., the anode material of Example 3), wherein x3 is 4, the element M is W, the atomic proportion of the element M is about 1 to 10 atomic %, and the average particle diameter of the cobalt-copper-tin oxide ranges from about 0.1 μm to about 10 μm.
Preparation of Secondary Battery The crushed and ground anode material of Example 3, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. After that, the dried copper foil was cut into the anode of Example 3 with a diameter of about 12.8 mm by a cutting machine.

A button-type battery (model: CR2032) was assembled, which uses the anode of Example 3 as the working electrode, lithium metal as the counter electrode, 1M $LiPF_6$ added to an organic solvent as the electrolyte, a polypropylene film (trade name: Celgard #2400, manufactured by Celgard) as the separator and stainless steel 304 or 316 cover as the package structure. So far, the secondary battery of Example 3 was prepared.

Example 4

Preparation of Anode Material

At room temperature, a ball mill was used to grind and mix CoO powder (cobalt oxide), CuO powder (copper oxide), $SnO_2$ powder (tin oxide), and W oxide powder (oxide containing element M) to obtain an oxide mixture containing cobalt, copper and tin (i.e., the anode material of Example 4), wherein the atomic ratio of cobalt to copper to tin is 1:1:1, the element M is W, and the atomic proportion of the element M is about 1 to 10 atomic %.
Preparation of Secondary Battery The anode material of Example 4, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. After that, the dried copper foil was cut into the anode of Example 4 having a diameter of about 12.8 mm by a cutting machine.

A button-type battery (model: CR2032) was assembled, which uses the anode of Example 4 as the working electrode, lithium metal as the counter electrode, 1M $LiPF_6$ added to an organic solvent as the electrolyte, a polypropylene film (trade name: Celgard #2400, made by Celgard) as the separator and stainless steel 304 or 316 cover as the package structure. So far, the secondary battery of Example 4 was prepared.

Example 5

Preparation of Anode Material

At room temperature, a ball mill was used to grind $SiO_2$ powder (precursor containing silicon), $SnO_2$ powder (precursor containing tin), $Fe_2O_3$ powder (precursor containing iron), $TiO_2$ powder (precursor containing element M), and then the resulted powders were mixed and pressed into a green pellet with a diameter of about 1 cm. The green pellet was placed in a high-temperature furnace to obtain the bulk material of the silicon-tin-iron oxide represented by the aforementioned Formula (4) (i.e., the anode material of Example 4), wherein x4 is 21, the element M is Ti, the atomic proportion of the element M is about 1 to 10 atomic %, and the average particle diameter of the silicon-tin-iron oxide ranges from about 0.1 μm to about 10 μm.
Preparation of Secondary Battery The crushed and ground anode material of Example 5, Super P conductive carbon, and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. After that, the dried copper foil was cut into the anode of Example 5 having a diameter of about 12.8 mm by a cutting machine.

A button-type battery (model: CR2032) was assembled, which uses the anode of Example 5 as the working electrode, lithium metal as the counter electrode, 1M $LiPF_6$ added to an organic solvent as the electrolyte, a polypropylene film (trade name: Celgard #2400, manufactured by Celgard) as the separator and stainless steel 304 or 316 cover as the package structure. So far, the secondary battery of Example 5 was prepared.

Example 6

Preparation of Anode Material

At room temperature, a ball mill was used to grind and mix $SiO_2$ powder (silicon oxide), $SnO_2$ powder (tin oxide), $Fe_2O_3$ powder (iron oxide), and $TiO_2$ powder (oxide containing element M) to obtain an oxide mixture containing silicon, tin and iron (i.e., the anode material of Example 6), wherein the atomic ratio of silicon to tin to iron is 4:1:16, the element M is Ti, and the atomic proportion of the element M is about 1 to 10 atomic %.
Preparation of Secondary Battery The anode material of Example 6, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 6 having a diameter of about 12.8 mm by a cutting machine.

A button-type battery (model: CR2032) was assembled, which uses the anode of Example 6 as the working electrode, lithium metal as the counter electrode, 1M $LiPF_6$ added to an organic solvent as the electrolyte, a polypropylene film (trade name: Celgard #2400, made by Celgard) as the separator and stainless steel 304 or 316 cover as the package structure. So far, the secondary battery of Example 6 was prepared.

Example 7

Preparation of Anode Material

At room temperature, a ball mill was used grind CuO powder (precursor containing copper), MnO powder (precursor containing manganese), $SiO_2$ powder (precursor containing silicon), $TiO_2$ powder (precursor containing element M), and then the resulted powders were mixed and pressed into a green pellet with a diameter of about 1 cm. The green pellet was placed in a high-temperature furnace to obtain the bulk material of the copper-manganese-silicon oxide represented by the aforementioned Formula (7) (i.e., the anode material of Example 7), wherein x7 is 1, element M is Ti, the atomic proportion of the element M is about 1 to 10 atomic %, and the average particle diameter of the copper-manganese-silicon oxide ranges from about 0.1 μm to about 10 μm.

Preparation of Secondary Battery

The crushed and ground anode material of Example 7, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 7 having a diameter of about 12.8 mm by a cutting machine.

A button-type battery (model: CR2032) was assembled, which uses the anode of Example 7 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 7 was prepared.

Example 8

Preparation of Anode Material

At room temperature, a ball mill was used to grind and mix CuO powder (copper oxide), MnO powder (manganese oxide), SiO$_2$ powder (silicon oxide), TiO$_2$ powder (oxide containing element M) to obtain an oxide mixture containing copper, manganese and silicon (i.e., the anode material of Example 8), wherein the atomic ratio of copper to manganese to silicon is 1:4:1, the element M is Ti, and the atomic proportion of the element M is about 1 to 10 atomic %.

Preparation of Secondary Battery

The anode material of Example 8, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry onto a copper foil (the current collector described above) evenly, and then the copper foil applied with the slurry was placed in a vacuum oven to dry at about 110° C. for about 12 hours. Then, the dried copper foil was cut into the anode of Example 8 with a diameter of about 12.8 mm by a cutting machine.

A button-type battery (model: CR2032) was assembled, which uses the anode of Example 8 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 8 was prepared.

Example 9

Preparation of Anode Material

At room temperature, a ball mill was used to grind SnO$_2$ powder (precursor containing tin), MnO$_2$ powder (precursor containing manganese), NiO powder (precursor containing nickel), Mo oxide powder (precursor containing element M), and then the resulted powders were mixed and pressed into a green pellet having a diameter of about 1 cm. The green pellet was placed in a high-temperature furnace to obtain the bulk material of the tin-manganese-nickel oxide represented by the aforementioned Formula (8) (i.e., the anode material of Example 9), wherein x8 is 7, the element M is Mo, the atomic proportion of the element M is about 1 to 10 atomic %, and the average particle diameter of the tin-manganese-nickel oxide ranges from about 0.1 μm to about 10 μm.

Preparation of Secondary Battery

The crushed and ground anode material of Example 9, Super P conductive carbon, and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 9 having a diameter of about 12.8 mm by a cutting machine.

A button-type battery (model: CR2032) was assembled, which uses the anode of Example 9 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 9 was prepared.

Example 10

Preparation of Anode Material

At room temperature, a ball mill was used to grind and mix SnO$_2$ powder (tin oxide), MnO$_2$ powder (manganese oxide), NiO powder (nickel oxide), Mo oxide powder (oxide containing element M) to obtain an oxide mixture containing tin, manganese and nickel (i.e., the anode material of Example 10), wherein the atomic ratio of tin to manganese to nickel is 1:2:1, the element M is Mo, and the atomic proportion of the element M is about 1 to 10 atomic %.

Preparation of Secondary Battery

The anode material of Example 10, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven tp dry at about 110° C. for about 12 hours. After that, the dried copper foil was cut into the anode of Example 10 with a diameter of about 12.8 mm by a cutting machine.

A button-type battery (model: CR2032) was assembled, which uses the anode of Example 10 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 10 was prepared.

Example 11

Preparation of Anode Material

At room temperature, a ball mill was used to grind MnO$_2$ powder (precursor containing manganese), CuO powder (precursor containing copper), NiO powder (precursor containing nickel), and Mo oxide powder (precursor containing element M), and then the resulted powders were mixed and pressed into a green pellet having a diameter of about 1 cm.

The green pellet was placed in a high-temperature furnace to obtain the bulk material of the manganese-copper-nickel oxide represented by the aforementioned Formula (13) (i.e., the anode material of Example 11), wherein the element M is Mo, the atomic proportion of the element M is about 1 to 10 atomic %, and the average particle diameter of the manganese-copper-nickel oxide ranges from about 0.1 μm to about 10 μm.

Preparation of Secondary Battery

The crushed and ground anode material of Example 11, Super P conductive carbon, and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 11 having a diameter of about 12.8 mm by a cutting machine.

A button-type battery (model: CR2032) was assembled, which uses the anode of Example 11 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 11 was prepared.

Example 12

Preparation of Anode Material

At room temperature, a ball mill was used to grind and mix MnO$_2$ powder (manganese oxide), CuO powder (copper oxide), NiO powder (nickel oxide), and Mo oxide powder (oxide containing element M) to obtain an oxide mixture containing manganese, copper and nickel (i.e., the anode material of Example 12), wherein the atomic ratio of manganese to copper to nickel is 2:1:1, the element M is Mo, and the atomic proportion of the element M is about 1 to 10 atomic %.

Preparation of Secondary Battery

The anode material of Example 12, Super P conductive carbon and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. Then, the dried copper foil was cut into the anode of Example 12 having a diameter of about 12.8 mm by a cutting machine.

A button-type battery (model: CR2032) was assembled, which uses the anode of Example 12 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 12 was prepared.

Example 13

Preparation of Anode Material

At room temperature, a ball mill was used to grind and mix NiO powder (nickel oxide), CuO powder (copper oxide), SnO$_2$ powder (tin oxide), and W oxide powder (oxide containing element M) to obtain an oxide mixture containing nickel, copper and tin (i.e., the anode material of Example 13), wherein the atomic ratio of nickel to copper to tin is 1:1:2, the element M is W, and the atomic proportion of the element M is about 1 to 10 atomic %.

Preparation of Secondary Battery

The anode material of Example 13, Super P conductive carbon, and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 13 having a diameter of about 12.8 mm by a cutting machine.

A button-type battery (model: CR2032) was assembled, which uses the anode of Example 13 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 13 was prepared.

Example 14

Preparation of Anode Material

At room temperature, a ball mill was used to grind NiO powder (precursor containing nickel), CuO powder (precursor containing copper), SnO$_2$ powder (precursor containing tin), and W oxide powder (precursor containing element M), and then the resulted powders were mixed and pressed into a green pellet having a diameter of about 1 cm. The green pellet was placed in a high-temperature furnace to obtain the bulk material of the nickel-copper-tin oxide represented by the aforementioned Formula (15) (i.e., the anode material of Example 14), wherein x15 is 6, the element M is W, the atomic proportion of the element M is about 1 to 10 atomic %, and the average particle diameter of the nickel-copper-tin oxide ranges from about 0.1 μm to about 10 μm.

Preparation of Secondary Battery

The crushed and ground anode material of Example 14, Super P conductive carbon, and a binder (i.e., sodium carboxymethyl cellulose (CMC) dissolved in water) were mixed at a weight ratio of 7:2:1. Next, zirconia balls were added and mixed for about 30 minutes to form an anode slurry. Next, a spatula (100 μm) was used to apply the said slurry to a copper foil (the current collector described above) evenly, and then the copper foil applied with the slurry was placed in a vacuum oven to dry at about 110° C. for about 12 hours. After that, the dried copper foil was cut into the anode of Example 14 with a diameter of about 12.8 mm by a cutting machine.

A button-type battery (model: CR2032) was assembled, which uses the anode of Example 14 as the working electrode, lithium metal as the counter electrode, 1M LiPF$_6$ added to an organic solvent as the electrolyte, a polypropylene film (trade name: Celgard #2400, made by Celgard) as the separator and stainless steel 304 or 316 cover as the package structure. So far, the secondary battery of Example 14 was prepared.

Comparative Example 1

Preparation of Secondary Battery

The secondary battery of Comparative Example 1 was prepared according to the same preparation procedure as that of Example 1, and the difference between the secondary battery of Comparative Example 1 and the secondary battery of Example 1 is mainly that in the secondary battery of Example 1, the working electrode is the anode of Example 1; while in the secondary battery of Comparative Example 1, the material of the working electrode is $Co_2SnO_4$.

Comparative Example 2

Preparation of Secondary Battery

The secondary battery of Comparative Example 2 was prepared according to the same preparation procedure as that of Example 1, and the difference between the secondary battery of Comparative Example 2 and the secondary battery of Example 1 is mainly that in the secondary battery of Example 1, the working electrode is the anode of Example 1; while in the secondary battery of Comparative Example 2, the material of the working electrode is CoO.

Comparative Example 3

Preparation of Secondary Battery

The secondary battery of Comparative Example 3 was prepared according to the same preparation procedure as that of Example 1, and the difference between the secondary battery of Comparative Example 3 and the secondary battery of Example 1 is mainly that in the secondary battery of Example 1, the working electrode is the anode of Example 1; while in the secondary battery of Comparative Example 3, the material of the working electrode is CuO.

Comparative Example 4

Preparation of Secondary Battery

The secondary battery of Comparative Example 4 was prepared according to the same preparation procedure as that of Example 1, and the difference between the secondary battery of Comparative Example 4 and the secondary battery of Example 1 is mainly that in the secondary battery of Example 1, the working electrode is the anode of Example 1; while in the secondary battery of Comparative Example 4, the material of the working electrode is $SnO_2$.

Comparative Example 5

Preparation of Secondary Battery

The secondary battery of Comparative Example 5 was prepared according to the same preparation procedure as that of Example 1, and the difference between the secondary battery of Comparative Example 5 and the secondary battery of Example 1 is mainly that in the secondary battery of Example 1, the working electrode is the anode of Example 1; while in the secondary battery of Comparative Example 5, the material of the working electrode is $SiO_2$.

Comparative Example 6

Preparation of Secondary Battery

The secondary battery of Comparative Example 6 was prepared according to the same preparation procedure as that of Example 1, and the difference between the secondary battery of Comparative Example 6 and the secondary battery of Example 1 is mainly that in the secondary battery of Example 1, the working electrode is the anode of Example 1; while in the secondary battery of Comparative Example 6, the material of the working electrode is $Fe_2O_3$.

Comparative Example 7

Preparation of Secondary Battery

The secondary battery of Comparative Example 7 was prepared according to the same preparation procedure as that of Example 1, and the difference between the secondary battery of Comparative Example 7 and the secondary battery of Example 1 is mainly that in the secondary battery of Example 1, the working electrode is the anode of Example 1; while in the secondary battery of Comparative Example 7, the material of the working electrode is MnO.

Comparative Example 8

Preparation of Secondary Battery

The secondary battery of Comparative Example 8 was prepared according to the same preparation procedure as that of Example 1, and the difference between the secondary battery of Comparative Example 8 and the secondary battery of Example 1 is mainly that in the secondary battery of Example 1, the working electrode is the anode of Example 1; while in the secondary battery of Comparative Example 8, the material of the working electrode is $MnO_2$.

Comparative Example 9

Preparation of Secondary Battery

The secondary battery of Comparative Example 9 was prepared according to the same preparation procedure as that of Example 1, and the difference between the secondary battery of Comparative Example 9 and the secondary battery of Example 1 is mainly that in the secondary battery of Example 1, the working electrode is the anode of Example 1; while in the secondary battery of Comparative Example 9, the material of the working electrode is NiO.

After preparing the secondary batteries of Examples 1 to 14 and the secondary batteries of Comparative Examples 1 to 9, charge-discharge cycle test was performed on each of the secondary batteries of Examples 1 to 14 and the secondary batteries of Comparative Examples 1 to 9.

Charge-Discharge Cycle Test

Each of the secondary batteries of Examples 1 to 14 and the secondary batteries of Comparative Examples 1 to 9 was subjected to a battery cycle life capacity test at a voltage of 0.01 V to 3 V under an environment of about 15° C. to about 30° C. Measurement results are shown in FIG. 2 to FIG. 15.

Figure 2:
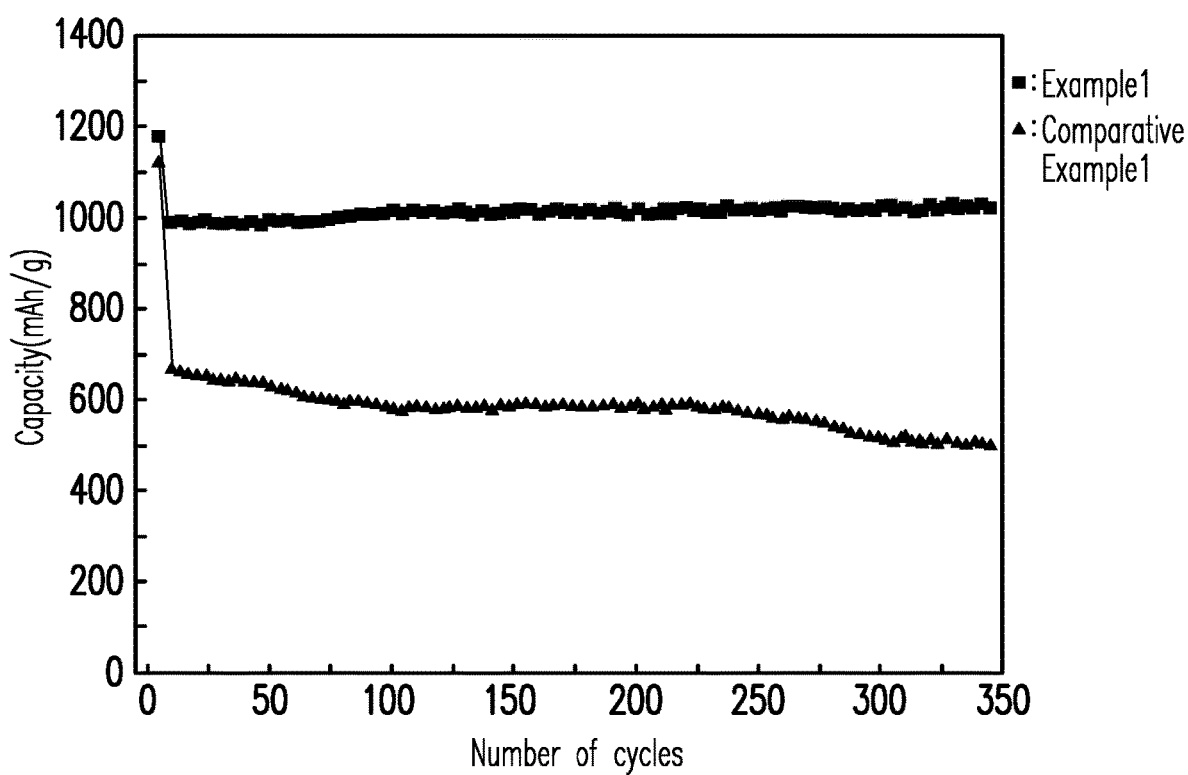
FIG. 2 is a cycle life curve diagram of the secondary batteries of Example 1 and Comparative Example 1.
Figure 3:
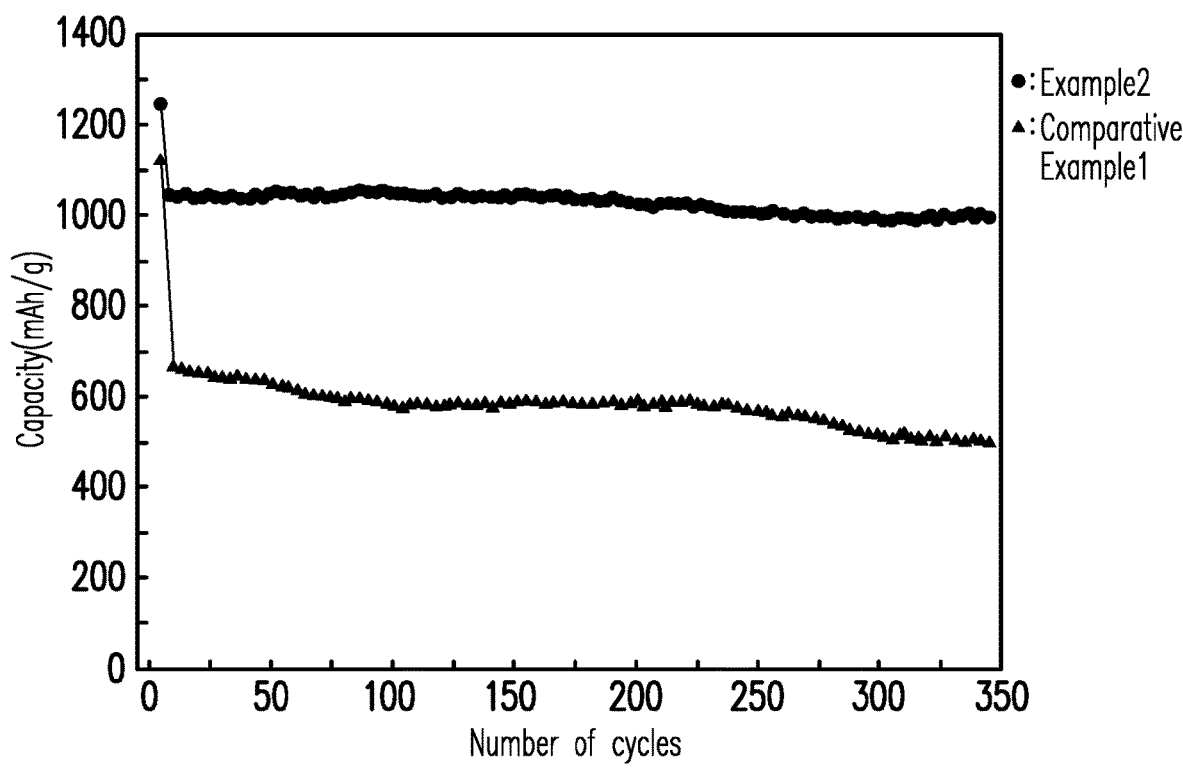
FIG. 3 is a cycle life curve diagram of the secondary batteries of Example 2 and Comparative Example 1.
Figure 4:
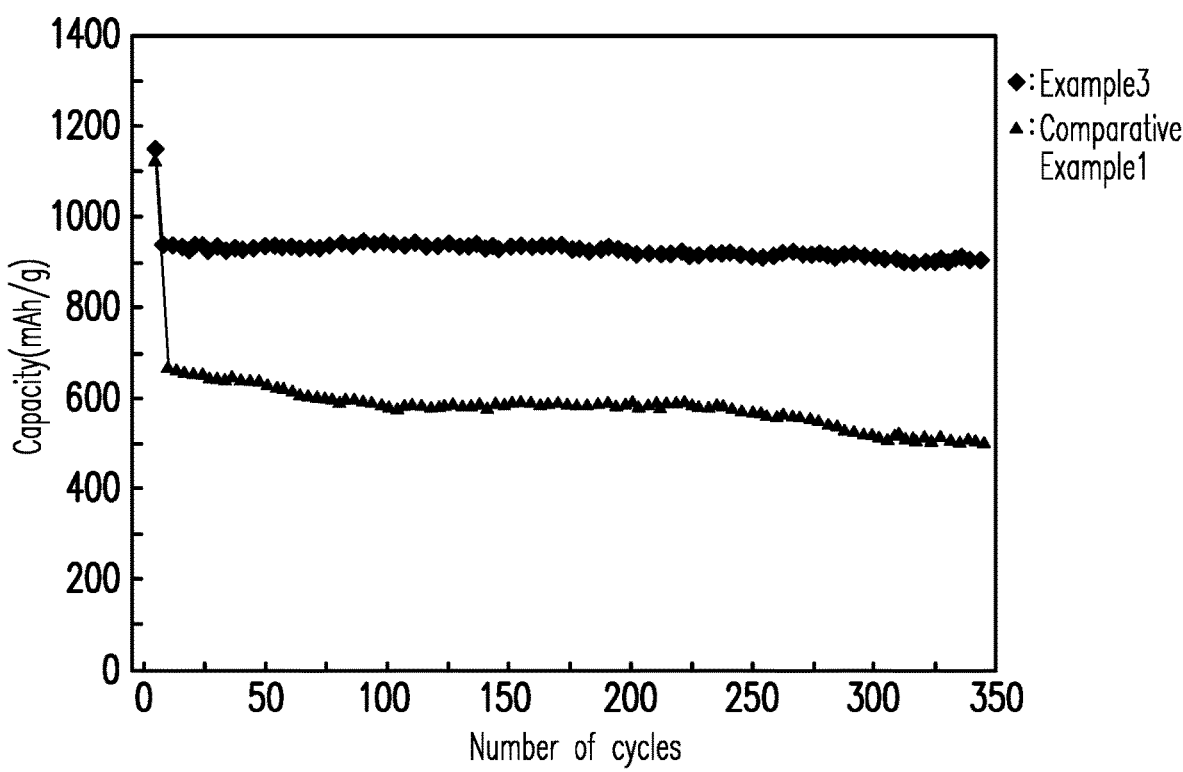
FIG. 4 is a cycle life curve diagram of the secondary batteries of Example 3 and Comparative Example 1.

As can be seen from FIG. 2 to FIG. 4, compared with the secondary battery of Comparative Example 1, after a high number of cycles (>250 times), the secondary batteries of Examples 1 to 3 have better capacitance and capacity retention.

Although the foregoing test was not performed on a secondary battery including the cobalt-copper-tin oxide represented by Formula (1) with x1 of 9 or 14, according to the foregoing description of the cobalt-copper-tin oxide and the test result of Example 1, those skilled in the art should understand that a secondary battery including the cobalt-copper-tin oxide represented by Formula (1) with x1 of 9 or 14 can have good capacitance and capacity retention.

Although the foregoing test was not performed on a secondary battery including the cobalt-copper-tin oxide represented by the Formula (2) with x2 of 6 or 8, according to the foregoing description of the cobalt-copper-tin oxide and the test result of Example 2, those skilled in the art should understand that a secondary battery including the cobalt-copper-tin oxide represented by Formula (2) with x2 of 6 or 8 can have good capacitance and capacity retention.

Although the foregoing test was not performed on a secondary battery including the cobalt-copper-tin oxide represented by Formula (3) with x3 of 3 or 5, according to the foregoing description of the cobalt-copper-tin oxide and the test result of Example 1, those skilled in the art should understand that a secondary battery including the cobalt-copper-tin oxide represented by the Formula (3) with x3 of 3 or 5 can have good capacitance and capacity retention.

Figure 5:
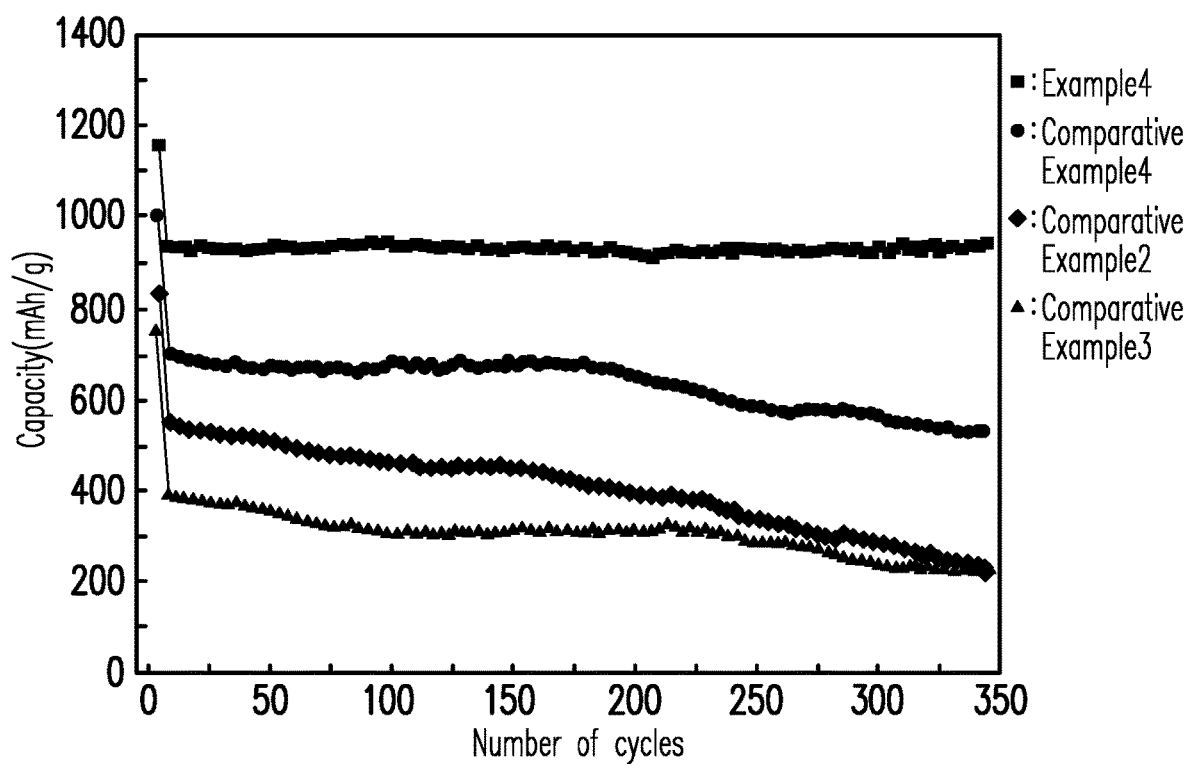
FIG. 5 is a cycle life curve diagram of the secondary batteries of Example 4 and Comparative Examples 2 to 4.

As can be seen from FIG. 5, compared with the secondary batteries of Comparative Examples 2 to 4, after a high number of cycles (>250 times), the secondary battery of Example 4 has better capacitance and capacity retention.

Although the foregoing test was not performed on a secondary battery including the oxide mixture containing cobalt, copper and tin having the atomic ratio of cobalt to copper to tin of 5:1:3 or 2:1:1, according to the foregoing description of the oxide mixture containing cobalt, copper and tin and the test result of Example 4, those skilled in the art should understand that a secondary battery including the oxide mixture containing cobalt, copper and tin having the atomic ratio of cobalt to copper to tin of 5:1:3 or 2:1:1 can have good capacitance and capacity retention.

Figure 6:
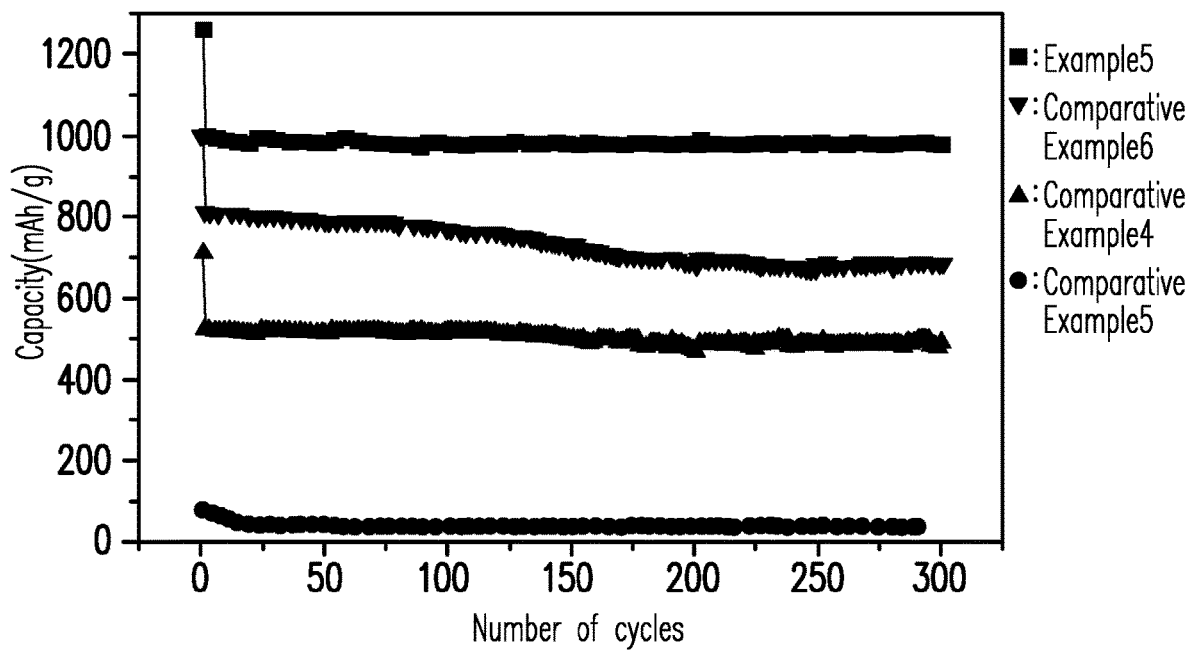
FIG. 6 is a cycle life curve diagram of the secondary batteries of Example 5 and Comparative Examples 4 to 6.
Figure 7:
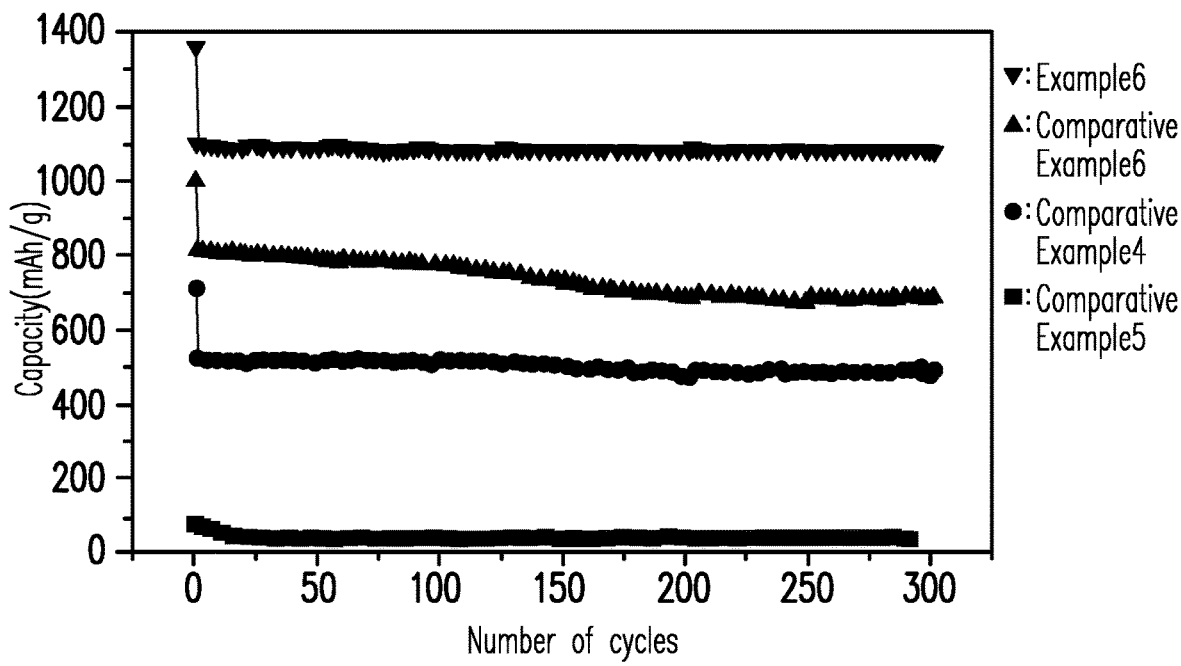
FIG. 7 is a cycle life curve diagram of the secondary batteries of Example 6 and Comparative Examples 4 to 6.

As can be seen from FIG. 6 and FIG. 7, compared with the secondary batteries of Comparative Examples 4 to 6, after a high number of cycles (>250 times), the secondary batteries of Examples 5 and 6 have better capacitance and capacity retention.

Although the foregoing test was not performed on a secondary battery including the silicon-tin-iron oxide represented by Formula (4) with x4 of greater than 21 to 34, according to the foregoing description of the silicon-tin-iron oxide and the test result of Example 5, those skilled in the art should understand that a secondary battery including the silicon-tin-iron oxide represented by Formula (4) with x4 of greater than 21 to 34 can have good capacitance and capacity retention.

Although the foregoing test was not performed on a secondary battery including the silicon-tin-iron oxide represented by the Formula (5) or the Formula (6), according to the foregoing description of the silicon-tin-iron oxide and the test result of Example 5, those skilled in the art should understand that a secondary battery including the silicon-tin-iron oxide represented by Formula (5) or Formula (6) can have good capacitance and capacity retention.

Although the foregoing test was not performed on a secondary battery including the oxide mixture containing silicon, tin and iron having the atomic ratio of silicon to tin to iron of 1:1:1 or 4:1:1, according to the foregoing description of the oxide mixture containing silicon, tin and iron and the test result of Example 6, those skilled in the art should understand that a secondary battery including the oxide mixture containing silicon, tin and iron having the atomic ratio of silicon to tin to iron of 1:1:1 or 4:1:1 can have good capacitance and capacity retention.

Figure 8:
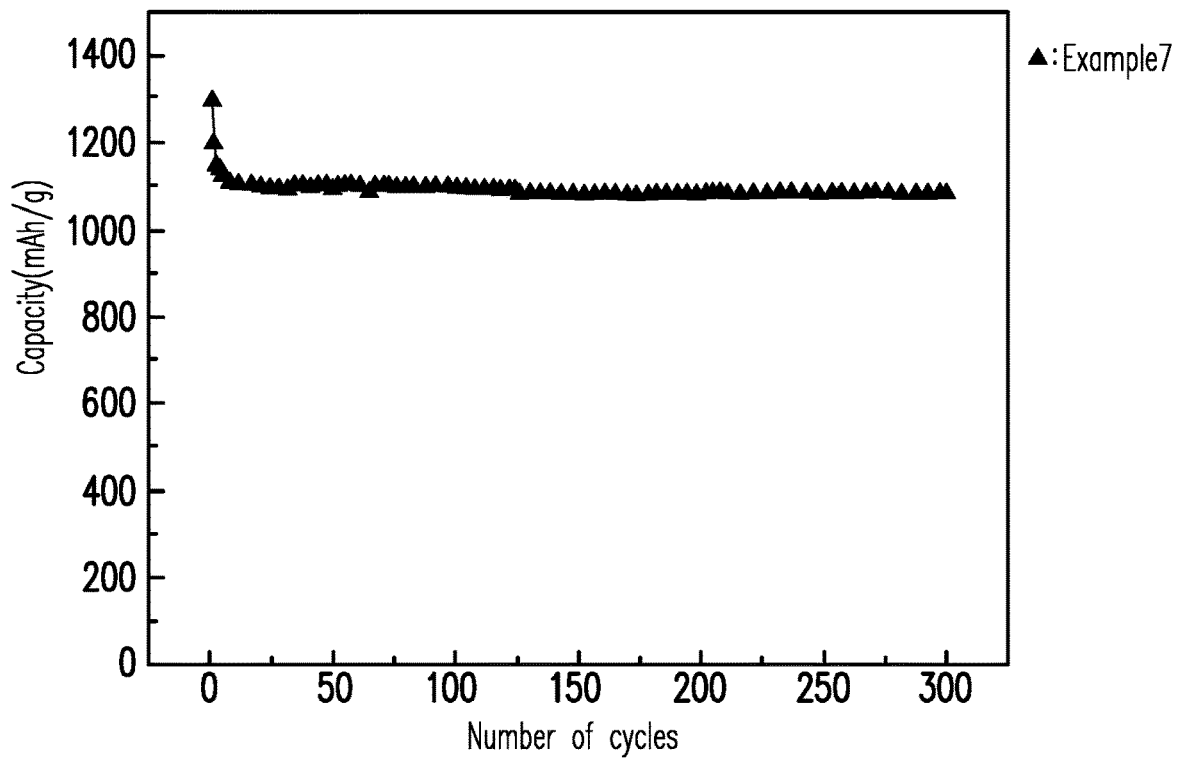
FIG. 8 is a cycle life curve diagram of the secondary battery of Example 7.

As can be seen from FIG. 8 that after a high number of cycles (>250 times), the secondary battery of Example 7 has good capacitance and capacity retention.

Although the foregoing test was not performed on a secondary battery including the copper-manganese-silicon oxide represented by Formula (7) with x7 of greater than 0 to less than 1, according to the foregoing description of the copper-manganese-silicon oxide and the test result of Example 7, those skilled in the art should understand that a secondary battery including the copper-manganese-silicon oxide represented by Formula (7) with x7 of greater than 0 to less than 1 can have good capacitance and capacity retention.

Figure 9:
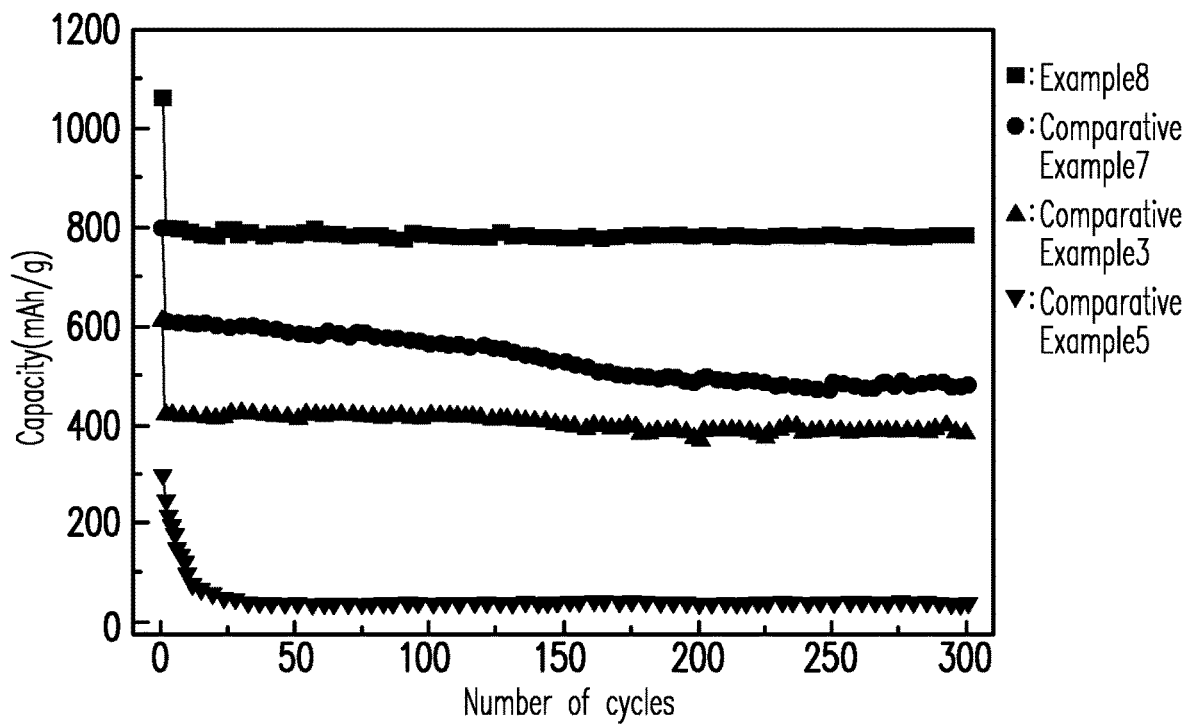
FIG. 9 is a cycle life curve diagram of the secondary batteries of Example 8 and Comparative Examples 3, 5, and 7.

As can be seen from FIG. 9, compared with the secondary batteries of Comparative Examples 3, 5 and 7, after a high number of cycles (>250 times), the secondary battery of Example 8 has better capacitance and capacity retention.

Although the foregoing test was not performed on a secondary battery including the oxide mixture containing copper, manganese and silicon having the atomic ratio of copper to manganese to silicon of 1:1:1, 4:1:1, or 1:1:4, according to the foregoing description of the oxide mixture containing copper, manganese and silicon and the test result of Example 8, those skilled in the art should understand that a secondary battery including the oxide mixture containing copper, manganese and silicon having the atomic ratio of copper to manganese to silicon of 1:1:1, 4:1:1 or 1:1:4 can have good capacitance and capacity retention.

Figure 10:
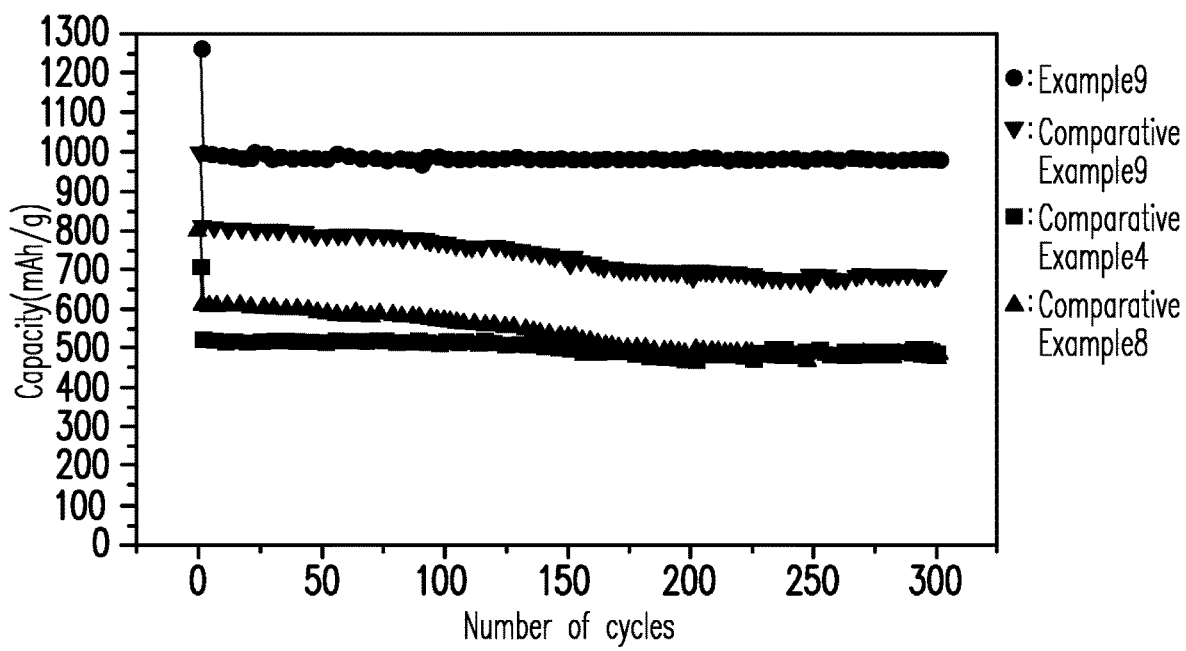
FIG. 10 is a cycle life curve diagram of the secondary batteries of Example 9 and Comparative Examples 4, 8 to 9.
Figure 11:
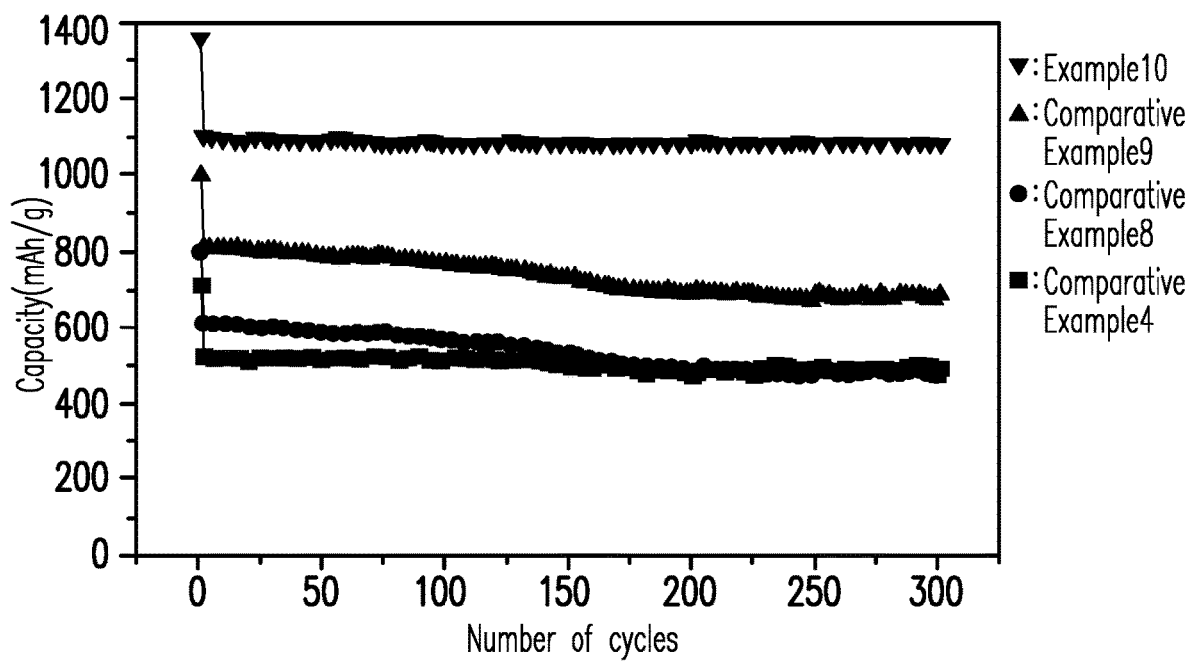
FIG. 11 is a cycle life curve diagram of the secondary batteries of Example 10 and Comparative Examples 4, 8 to 9.

As can be seen from FIG. 10 and FIG. 11, compared with the secondary batteries of Comparative Examples 4, 8, and 9, after a high number of cycles (>250 times), the secondary batteries of Examples 9 and 10 have better capacitance and capacity retention.

Although the foregoing test was not performed on a secondary battery including the tin-manganese-nickel oxide represented by the Formula (8) with x8 of 4 to less than 7, according to the foregoing description of the tin-manganese-nickel oxide and the test result of Example 9, those skilled in the art should understand that a secondary battery including the tin-manganese-nickel oxide represented by Formula (8) with x8 of 4 to less than 7 can have good capacitance and capacity retention.

Although the foregoing test was not performed on a secondary battery including the tin-manganese-nickel oxide represented by the Formula (9), the Formula (10), or Formula (11), according to the foregoing description of the tin-manganese-nickel oxide and the test result of Example 9, those skilled in the art should understand that a secondary battery including the tin-manganese-nickel oxide represented by Formula (9), Formula (10), or Formula (11) can have good capacitance and capacity retention.

Although the foregoing test was not performed on a secondary battery including the oxide mixture containing tin, manganese and nickel having the atomic ratio of tin to manganese to nickel of 1:1:1, 1:1:2, or 2:1:1, according to the foregoing description of the oxide mixture containing tin, manganese and nickel and the test result of Example 10, those skilled in the art should understand that a secondary battery including the oxide mixture containing tin, manganese and nickel having the atomic ratio of tin to manganese to nickel of 1:1:1, 1:1:2 or 2:1:1 can have good capacitance and capacity retention.

Figure 12:
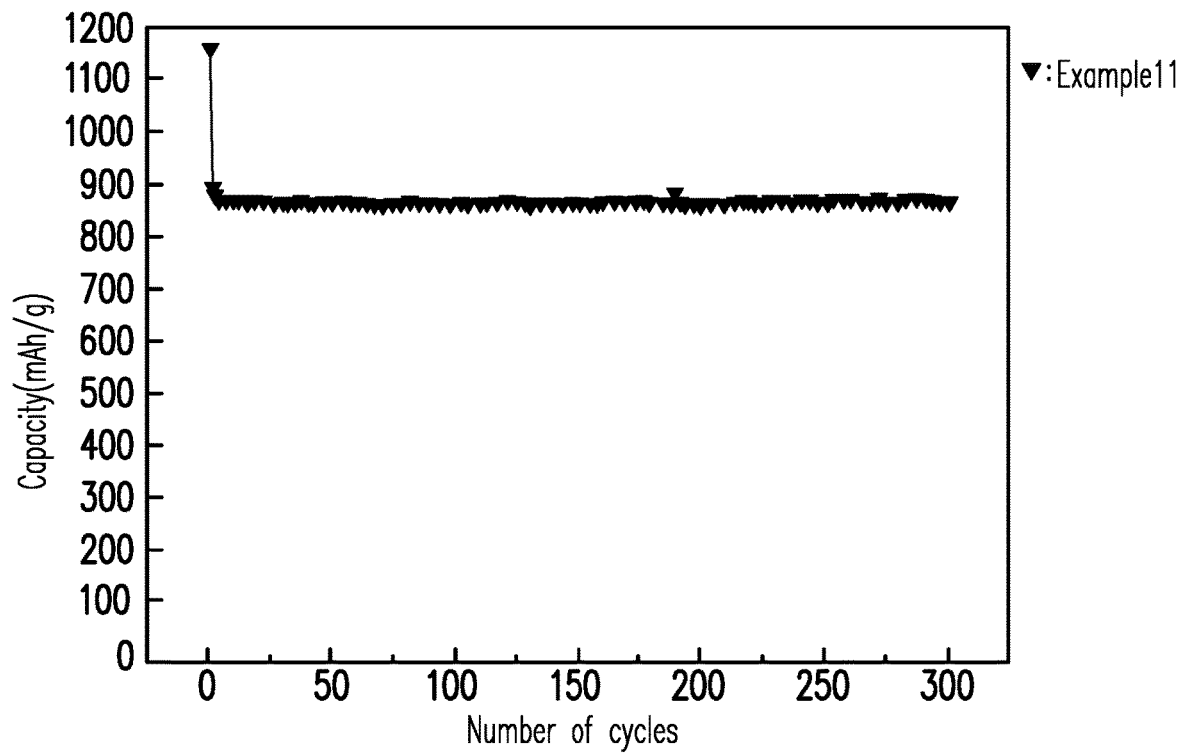
FIG. 12 is a cycle life curve diagram of the secondary battery of Example 11.

As can be seen from FIG. 12 that after a high number of cycles (>250 times), the secondary battery of Example 11 has good capacitance and capacity retention.

Although the foregoing test was not performed on a secondary battery including the manganese-copper-nickel oxide represented by Formula (12) or Formula (14), according to the foregoing description of the manganese-copper-nickel oxide and the test result of Example 11, those skilled in the art should understand that a secondary battery including the manganese-copper-nickel oxide represented by Formula (12) or Formula (14) can have good capacitance and capacity retention.

Figure 13:
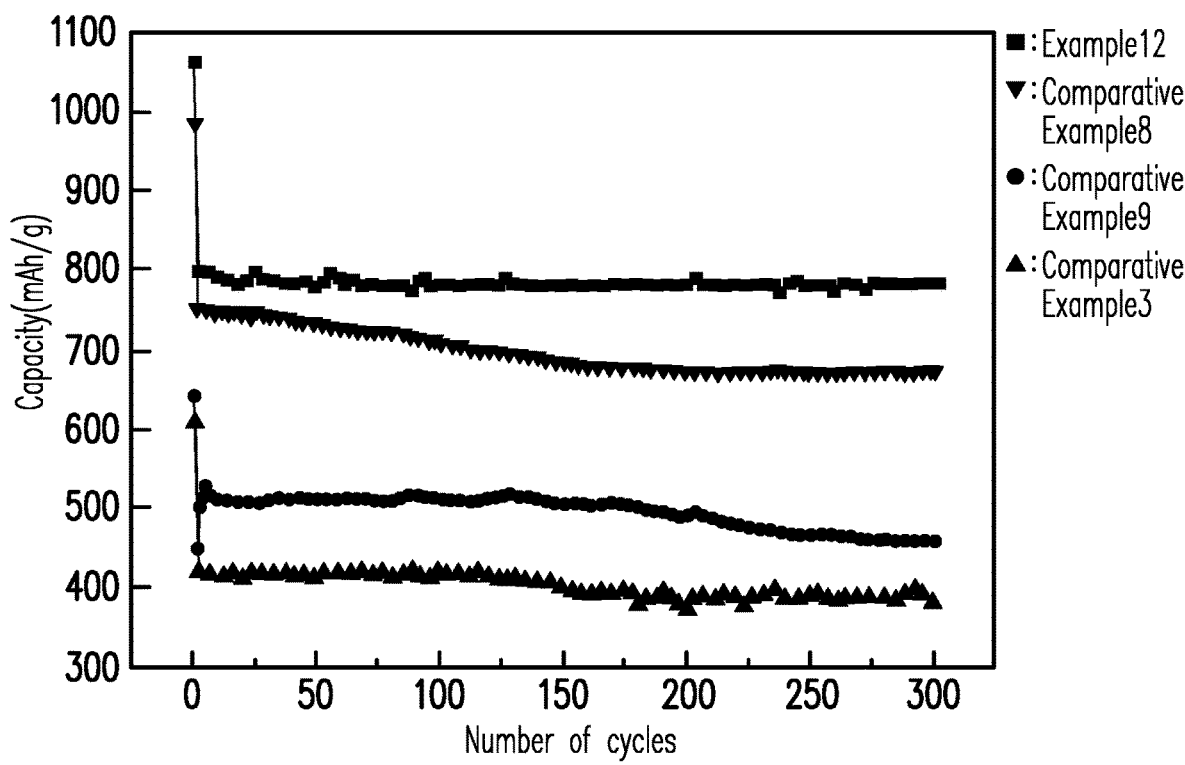
FIG. 13 is a cycle life curve diagram of the secondary batteries of Example 12 and Comparative Examples 3, 8 to 9.

As can be seen from FIG. 13, compared with the secondary batteries of Comparative Examples 3, 8 and 9, after a high number of cycles (>250 times), the secondary battery of Example 12 has better capacitance and capacity retention.

Although the foregoing test was not performed on a secondary battery including the oxide mixture containing manganese, copper and nickel having the atomic ratio of manganese to copper to nickel of 3:2:1 or 1:1:1, according to the foregoing description of the oxide mixture containing manganese, copper and nickel and the test result of Example 12, those skilled in the art should understand that a secondary battery including the oxide mixture containing manganese, copper and nickel having the atomic ratio of manganese to copper to nickel of 3:2:1 or 1:1:1 can have good capacitance and capacity retention.

Figure 14:
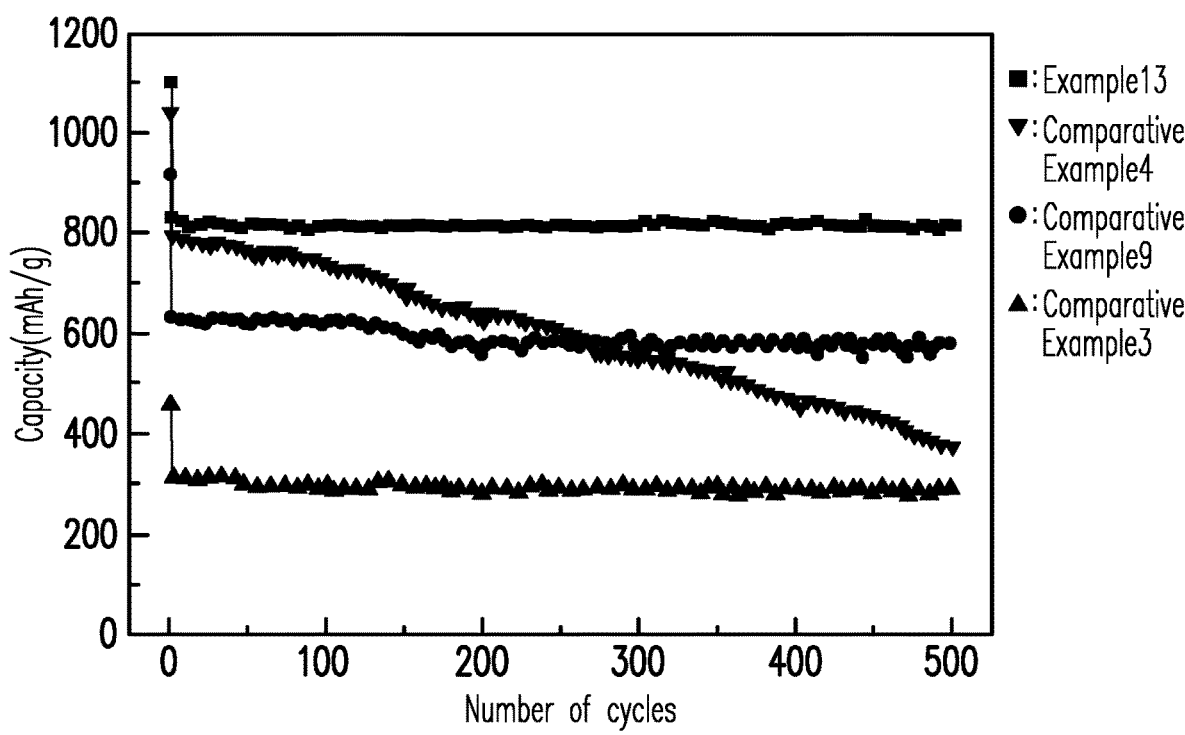
FIG. 14 is a cycle life curve diagram of the secondary battery of Example 13 and Comparative Examples 3 to 4, and 9.

As can be seen from FIG. 14, compared with the secondary batteries of Comparative Examples 3, 4, and 9, after a high number of cycles (>250 times), the secondary battery of Example 13 has better capacitance and capacity retention.

Although the foregoing test was not performed on a secondary battery including the oxide mixture containing nickel, copper and tin having the atomic ratio of nickel to copper to tin of 2:1:3 or 1:2:3, according to the foregoing description of the oxide mixture containing nickel, copper and tin and the test result of Example 13, those skilled in the art should understand that a secondary battery including the oxide mixture containing nickel, copper and tin having the atomic ratio of nickel to copper to tin of 2:1:3 or 1:2:3 can have good capacitance and capacity retention.

Figure 15:
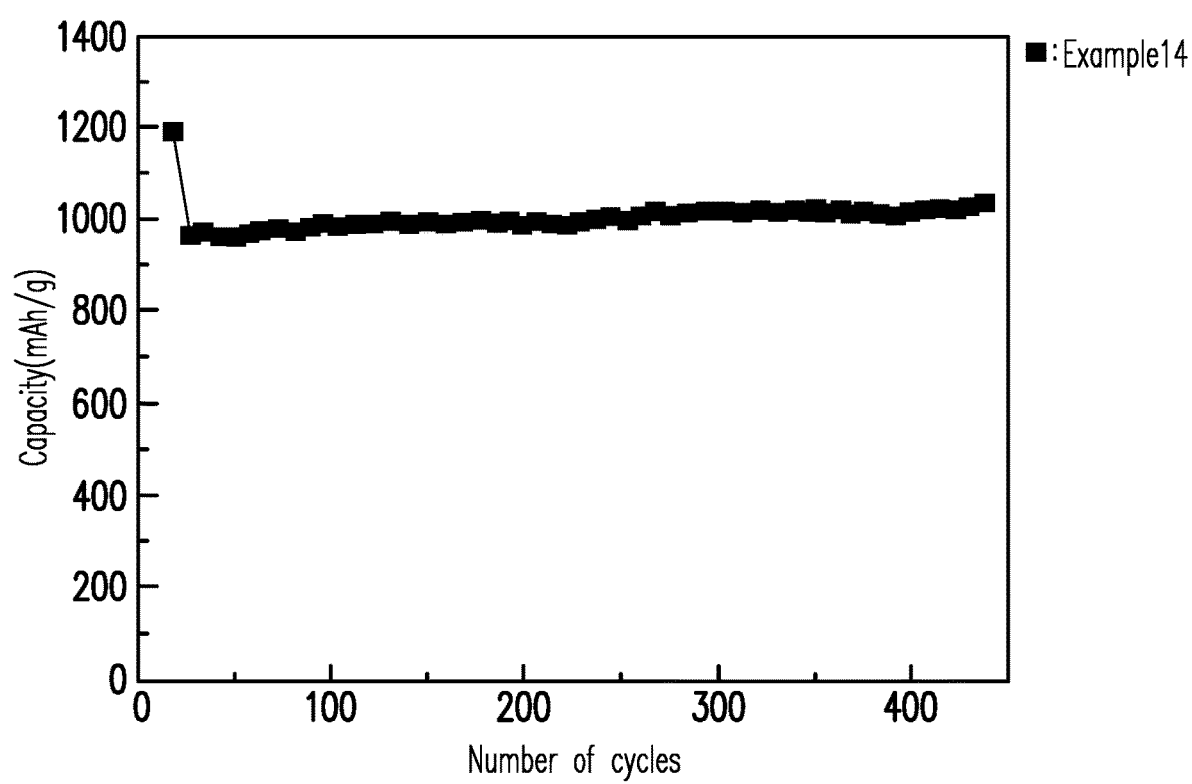
FIG. 15 is a cycle life curve diagram of the secondary battery of Example 14.

As can be seen from FIG. 15 that after a high number of cycles (>250 times), the secondary battery of Example 14 has good capacitance and capacity retention.

Although the foregoing test was not performed on a secondary battery including the nickel-copper-tin oxide represented by Formula (15) with x15 of 3 or 9, according to the foregoing description of the nickel-copper-tin oxide and the test result of Example 14, those skilled in the art should understand that a secondary battery including the nickel-copper-tin oxide represented by Formula (15) with x15 of 3 or 9 can have good capacitance and capacity retention.

Although the foregoing test was not performed on a secondary battery including the nickel-copper-tin oxide represented by Formula (16) or Formula (17), according to the foregoing description of the nickel-copper-tin oxide and the test result of Example 14, those skilled in the art should understand that a secondary battery including the nickel-copper-tin oxide represented by Formula (16) or Formula (17) can have good capacitance and capacity retention.

Based on the foregoing test results, it is confirmed that by using the anode material for a secondary battery of the present invention to prepare an anode, the secondary battery to which the anode is applied can have good capacitance, stability, and charge-discharge cycle life.

In addition, compared with commercially available graphite (theoretical value of the capacitance is 372 mAh/g), the secondary battery using the anode made of the anode material for a secondary battery of the present invention has a higher capacitance, so the anode material for a secondary battery can effectively improve battery performance.

Although the invention has been described with reference to the above embodiments, it will be apparent to one of the ordinary skills in the art that modifications to the described embodiment may be made without departing from the spirit of the invention. Accordingly, the scope of the invention will be defined by the attached claims not by the above detailed descriptions.

What is claimed is:

1. An anode material for a secondary battery, comprising:
   an oxide mixture obtained by performing a mixing step of at least one of $SiO_2$ and SiO, at least one of SnO and $SnO_2$, and at least one of $Fe_2O_3$, $Fe_3O_4$ and FeO, wherein an atomic ratio of silicon to tin to iron in the oxide mixture is 4:1:16, 1:1:1, or 4:1:1.

2. The anode material for the secondary battery of claim 1, wherein the mixing step further comprises mixing an oxide containing M, wherein M is at least one element selected from the group consisting of Cr, Mn, Zn, Al, Ti, In, Mo and W, and an atomic proportion of M is greater than 0 to less than or equal to 10 atomic % relative to a total number of atoms of the elements other than oxygen element in the oxide mixture.

3. An anode for a secondary battery, comprising:
   a current collector; and
   an anode material layer disposed on the current collector and includes the anode material for the secondary battery of claim 1.

4. A secondary battery, comprising:
   a cathode;
   an anode separately disposed from the cathode, wherein the anode is the anode for the secondary battery of claim 3;
   an electrolyte provided between the cathode and the anode; and
   a package structure packaging the cathode, the anode and the electrolyte.

5. The secondary battery of claim 4, further comprising a separator disposed between the cathode and the anode, and the separator, the cathode and the anode define a housing region, and the electrolyte is disposed in the housing region.

* * * * *